US011317600B2

(12) United States Patent
Huthmaker et al.

(10) Patent No.: US 11,317,600 B2
(45) Date of Patent: May 3, 2022

(54) ANIMAL PEN

(71) Applicants: Robert Wayne Huthmaker, Glenwood Springs, CO (US); Julie Huthmaker, Glenwood Springs, CO (US)

(72) Inventors: Robert Wayne Huthmaker, Glenwood Springs, CO (US); Julie Huthmaker, Glenwood Springs, CO (US)

(*) Notice: Subject to any disclaimer, the term of this patent is extended or adjusted under 35 U.S.C. 154(b) by 264 days.

(21) Appl. No.: 16/244,055

(22) Filed: Jan. 9, 2019

(65) Prior Publication Data
US 2019/0208741 A1    Jul. 11, 2019

Related U.S. Application Data

(60) Provisional application No. 62/615,427, filed on Jan. 9, 2018.

(51) Int. Cl.
*A01K 1/03* (2006.01)
*F16B 7/04* (2006.01)
*F16B 5/12* (2006.01)

(52) U.S. Cl.
CPC ............ *A01K 1/03* (2013.01); *A01K 1/034* (2013.01); *F16B 5/121* (2013.01); *F16B 7/0426* (2013.01); *F16B 7/0486* (2013.01)

(58) Field of Classification Search
CPC ........ A01K 1/03; A01K 1/034; A01K 1/0245; A01K 3/00; A01K 1/0017; A01K 1/0023; E04H 17/165; E04H 17/18; E04H 17/185
See application file for complete search history.

(56) References Cited

U.S. PATENT DOCUMENTS 2,578,848 A * 12/1951 Shirley ............... E05B 65/0007
292/341.17
2,839,320 A    6/1958 Hill
(Continued)

FOREIGN PATENT DOCUMENTS

AU    2015101082 A4    9/2015
WO    2010111513 A1    9/2010

OTHER PUBLICATIONS

Kousi, "Small Pets Playpen Indoor Yard Fence for Small Animals Popup Kennel Crate, Portable & Large, Dog Guinea Pigs Rabbit Puppy Tent—Transparent 12 Plastic Panels", Retrieved from the Internet: <https://www.amazon.com/KOUSI-Playpen-Indoor-Animals-Portable/dp/B01L3JMRGQ/ref=redir_mobile_desktop?_encoding=UTF8&ref_=cm_cr_arp_mb_bdcrb_top>, retrieved Jan. 10, 2018 (9 pages).

(Continued)

*Primary Examiner* — Peter M Poon
*Assistant Examiner* — Marisa V Conlon
(74) *Attorney, Agent, or Firm* — Darrow Mustafa PC

(57) ABSTRACT

A pen for an animal, such as a dog, includes a plurality of walls and a frame. The plurality of walls can extend substantially vertically. The walls can include one or more wall panels. The wall panels can be transparent or highly translucent. The panels can be held in place at least in part by the frame, which can include a plurality of frame members and a plurality of connectors. The pen can include a door. A top frame member at the door can be movable to allow a person to freely enter and exit the space enclosed by the pen. The pen can provide confinement for an animal in a safe and aesthetically-pleasing manner. The pen can maximize the owner's ability to see his or her pet. The pen can provide the animal with clear visibility of its surroundings or owner, creating a lower stress environment for the pet.

16 Claims, 22 Drawing Sheets

(56) References Cited

U.S. PATENT DOCUMENTS

| | | | | |
|---|---|---|---|---|
| 3,606,620 | A | 9/1971 | Glover | |
| 4,819,582 | A * | 4/1989 | Lichvar | A01K 1/03 119/474 |
| 5,058,863 | A * | 10/1991 | Maffet | E04H 17/18 256/25 |
| 5,564,367 | A * | 10/1996 | Boyanton | A01K 1/034 119/474 |
| 6,851,135 | B1 | 2/2005 | Chen | |
| 6,871,614 | B2 * | 3/2005 | Goldwitz | A01K 1/00 119/436 |
| 6,874,177 | B2 | 4/2005 | Hsia | |
| D522,933 | S | 6/2006 | Monaghan | |
| 7,681,524 | B1 * | 3/2010 | Hudson | A01K 15/024 119/28.5 |
| D686,287 | S | 7/2013 | Boatwright | |
| D697,988 | S | 1/2014 | Januszek | |
| 8,640,761 | B2 | 2/2014 | Potter | |
| 8,919,284 | B2 | 12/2014 | Wolfe, Jr. et al. | |
| D731,611 | S | 6/2015 | Klein | |
| 9,382,750 | B1 * | 7/2016 | Flannery | E06B 7/32 |
| 9,622,602 | B2 * | 4/2017 | Potter | A47G 5/00 |
| 9,635,833 | B2 * | 5/2017 | Oeltjen | A01K 1/034 |
| 9,848,714 | B2 | 12/2017 | Burns et al. | |
| D809,216 | S | 1/2018 | French | |
| D812,174 | S | 3/2018 | Civile | |
| D820,526 | S | 6/2018 | Wilson et al. | |
| 10,094,496 | B2 | 10/2018 | Humm | |
| D852,907 | S | 7/2019 | Sergakis | |
| D866,088 | S | 11/2019 | Widner | |
| 10,786,098 | B1 | 9/2020 | Martin | |
| D900,409 | S | 10/2020 | Huthmaker et al. | |
| 2007/0151026 | A1 | 7/2007 | Felix | |
| 2008/0276872 | A1 | 11/2008 | Chern | |
| 2009/0090302 | A1 | 4/2009 | Conrad et al. | |
| 2009/0314220 | A1 * | 12/2009 | Groh | A01K 1/034 119/502 |
| 2010/0018466 | A1 | 1/2010 | Austin | |
| 2010/0154118 | A1 | 6/2010 | Pearce | |
| 2017/0306693 | A1 | 10/2017 | Potter | |
| 2018/0142718 | A1 * | 5/2018 | Zhu | F16B 7/0433 |
| 2019/0289814 | A1 * | 9/2019 | Zhuo | A01K 1/033 |

OTHER PUBLICATIONS

Tespo, "Tespo Dog Playpen, Portable Large Plastic Yard Fence for Small Animals, Popup Kennel Crate Fence Tent, Transparent White 12 Panels", Retrieved from the Internet: <https://www.amazon.com/Tespo-Playpen-Portable-Plastic-Transparent/dp/B06XTG94TH/ref=sr_1_3?ie=UTF8&qid=1522082785&sr=8-3&keywords=plastic+dog+pen>, retrieved Apr. 18, 2018 (11 pages).

U.S. Appl. No. 61/163,356, filed Mar. 25, 2009.

* cited by examiner

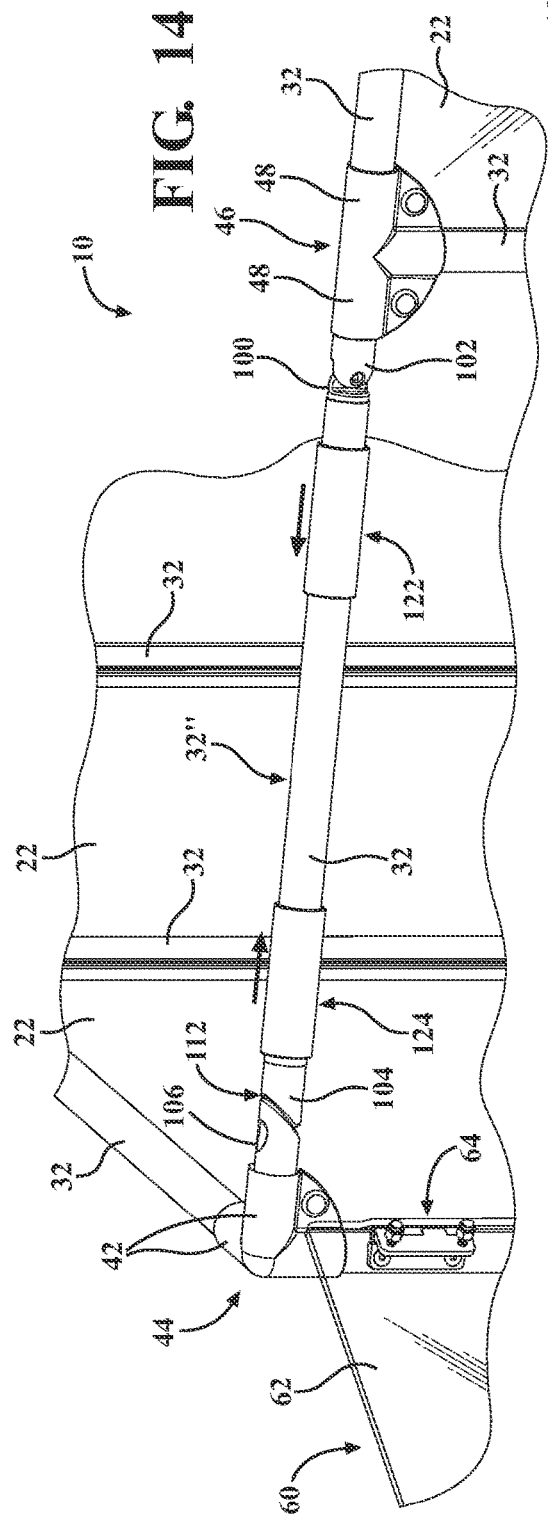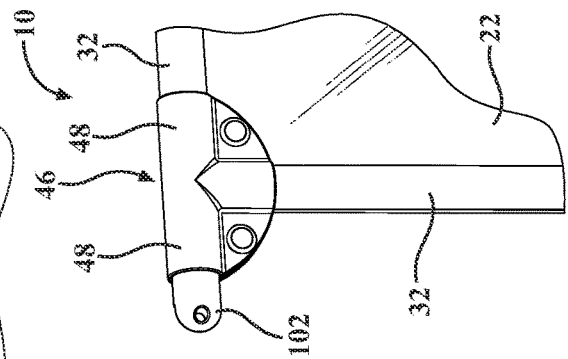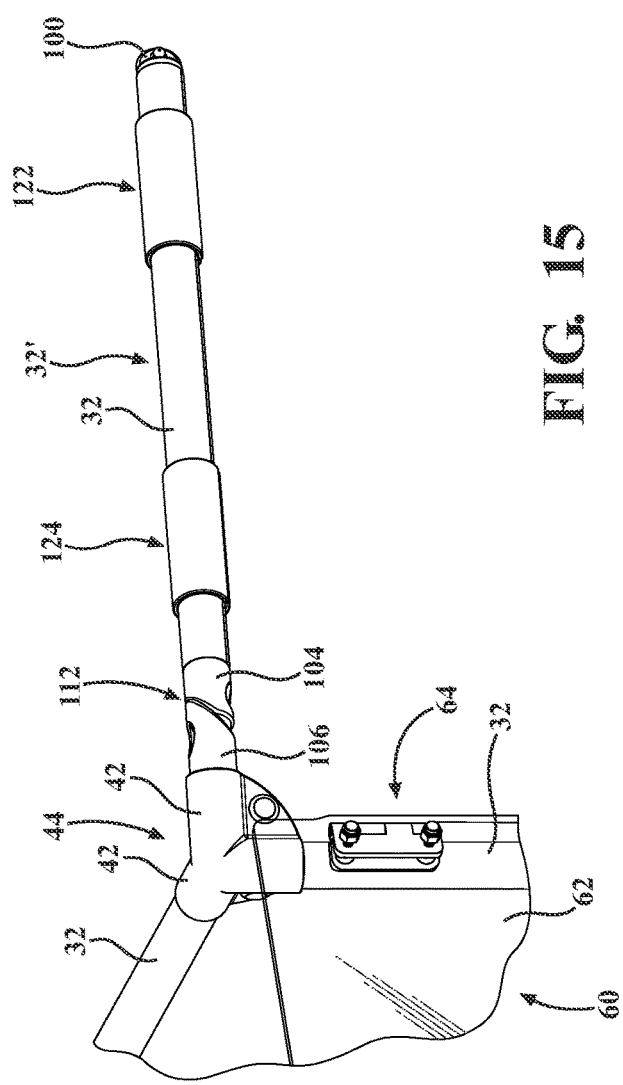

ANIMAL PEN

CROSS-REFERENCE TO RELATED APPLICATIONS

This application claims the benefit of U.S. Provisional Application No. 62/615,427, filed on Jan. 9, 2018, which is incorporated herein by reference in its entirety.

FIELD

The subject matter described herein relates in general to enclosures for animals and, more particularly, to animal pens.

BACKGROUND

Dog pens are used to provide a space in which a dog can rest, sleep, play, and/or move about, while keeping the dog safely contained. Dog pens are typically used indoors, but some dog pens can also be used outdoors. Some dog pens are portable and can be folded or collapsed for storage or transport.

SUMMARY

In one respect, the subject matter described herein are directed to animal pens, such as a dog pen. The pen can be supported on a surface and can surround an area. The pen can include a plurality of walls. The plurality of walls can extend substantially vertically. The plurality of walls can include one or more wall panels. At least some of the wall panels can be made of a transparent or highly translucent materials. The wall panels can be held in place by a frame. In one or more arrangements, the frame can include a plurality of frame members and a plurality of connectors. In one or more arrangements, one or more of the walls of the pen can include one or more doors.

In one respect, the subject matter presented herein is directed to an animal pen. The animal pen can include a frame. The frame can include a plurality of frame members. The plurality of frame members can be interconnected by a plurality of connectors. The animal pen can include a plurality of walls substantially surrounding a space. Each of the walls can include one or more wall panels. The frame members can be configured to engage and hold the wall panels in a substantially vertical orientation. The animal pen can include a door panel operatively connected to one of the frame members. The door panel can be configured to be selectively opened and closed. The door panel can at least partially define one of the walls when closed. An access opening to the space can be defined when the door panel is opened. Thus, an animal can enter or exit the space through the access opening when the door panel is open. The frame can include a top frame member that is located above the door panel when it is closed. The top frame member can extend substantially horizontally. The top frame member can be configured to be selectively moved out of the way to allow a person to walk directly into the space without having to step over a top of the pen.

In another respect, the subject matter presented herein is directed to an animal pen. The animal pen can include a frame. The frame can include a plurality of frame members. The plurality of frame members can be interconnected by a plurality of connectors. The frame members can be substantially tubular. The frame members can be at least partially hollow. The frame members can include one or more longitudinally extending slots that open to an exterior of the frame member. The plurality of frame members can include substantially horizontally extending frame members and substantially vertically extending frame members. The animal pen can include a plurality of walls. The plurality of walls can substantially surround a space. Each of the walls can include one or more wall panels. The wall panels can be received in a respective slot of the surrounding frame members such that the wall panel is held in a substantially vertical orientation. The wall panels can be transparent or highly translucent.

In another respect, the subject matter presented herein is directed to a kit for expanding an existing modular animal pen to include a bump out area. The kit can include a plurality of wall panels. The wall panels and/or the door panel can be transparent or highly translucent. The wall panels and/or the door panel can be made of acrylic or polycarbonate. The kit can include a plurality of frame members. The frame members can be at least partially hollow. The frame members can be substantially straight. The frame members can be substantially tubular. The frame members can define one or more longitudinally extending slots that open to an exterior of the frame member. The plurality of frame members can include substantially horizontally extending frame members and substantially vertically extending frame members. The kit can include a plurality of straight connectors. The straight connectors can be configured to interconnect a plurality of frame members that meet along a length of a wall of the animal pen.

BRIEF DESCRIPTION OF THE DRAWINGS

FIG. 14 is a view of a portion of the pen with a movable top frame member, showing the top frame member in a closed, unlocked position.

FIG. 15 is a view of a portion of the pen with a movable top frame member, showing an example of a first end of the movable top frame member being disengaged.

DETAILED DESCRIPTION

Arrangements described herein relate to systems, methods, apparatus, and/or kits relating to animal pens. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of embodiments and aspects herein. Arrangements are shown in FIGS. 1-34, but the embodiments are not limited to the illustrated structure(s) or application(s).

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features. In addition, numerous specific details are set forth in order to provide a thorough understanding of the embodiments described herein. However, it will be understood by those of ordinary skill in the art that the embodiments described herein can be practiced without these specific details.

Figure 1:
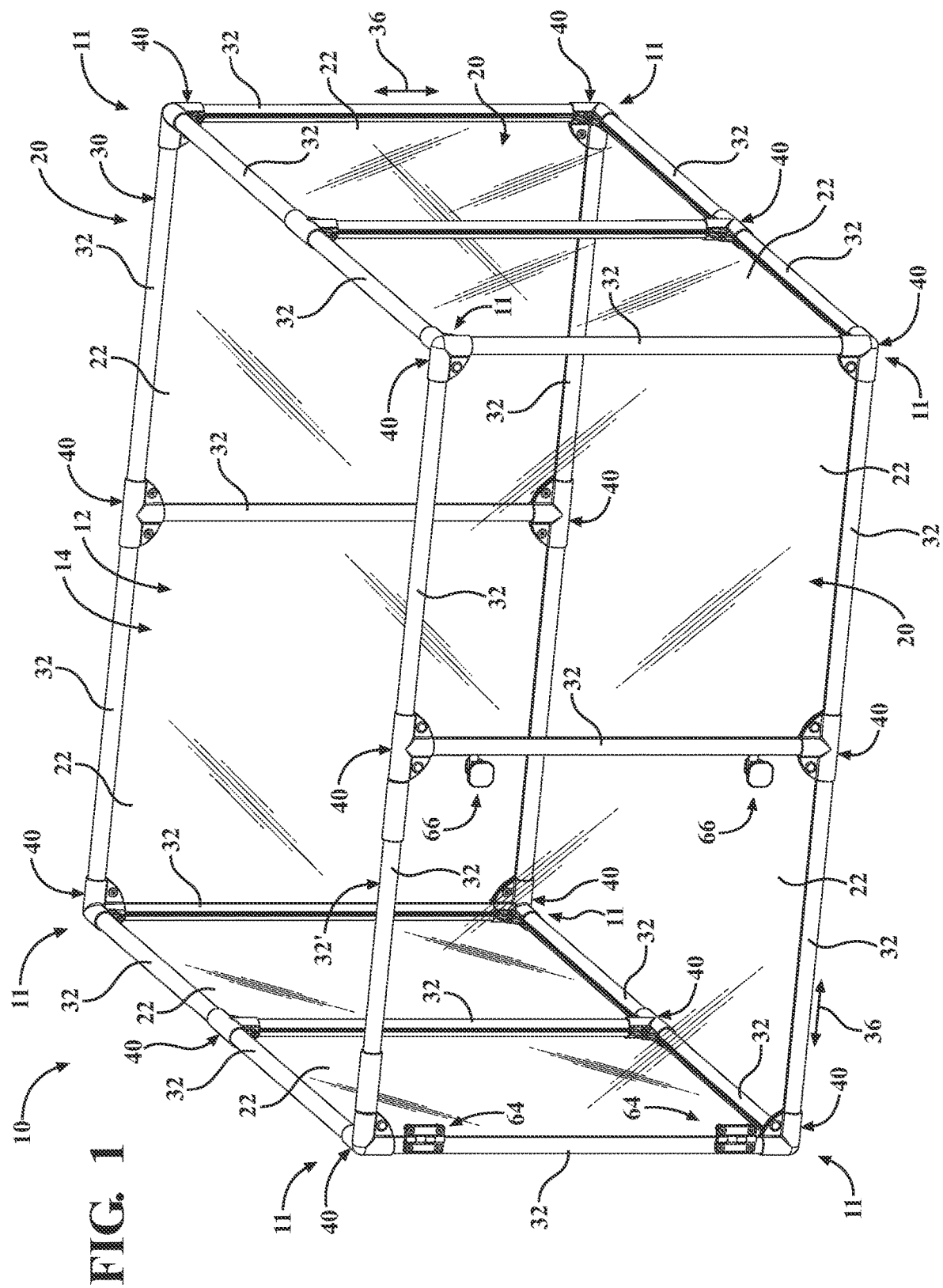
FIG. 1 is an example of a pen.

Referring to FIG. 1, an example of a pen 10 is shown. The pen 10 can include a plurality of walls 20. In one or more arrangements, the walls 20 can extend substantially vertically. As used herein, the terms "substantially" or "about" include exactly the term they modify and slight variations therefrom. Thus, for example, the term "substantially vertically" means exactly vertically and slight variations therefrom. Slight variations therefrom can include within about 15 degrees/percent/units or less, within about 10 degrees/percent/units or less, within about 9 degrees/percent/units or less, within about 8 degrees/percent/units or less, within about 7 degrees/percent/units or less, within about 6 degrees/percent/units or less, within about 5 degrees/percent/units or less, within about 4 degrees/percent/units or less, within about 3 degrees/percent/units or less, within about 2 degrees/percent/units or less, or within about 1 degree/percent/unit or less. Slight variations therefrom can include being within normal manufacturing tolerances. The walls 20 of the pen 10 can extend substantially perpendicular to a surface (e.g., the ground, the floor, etc.) upon which the pen 10 is supported.

The walls 20 of the pen 10 can substantially surround a space 12. In one or more arrangements, the pen 10 can have an open top 14. Alternatively or in addition, in one or more arrangements, the pen 10 can have an open bottom 16.

The pen 10 can have any suitable shape. In one or more arrangements, the pen 10 can be substantially rectangular. Additional shapes for the pen 10 can include substantially polygonal, substantially triangular, substantially square, substantially circular, or substantially oval, just to name a few possibilities.

The pen 10 can have any suitable size. For example, when the pen 10 is substantially rectangular, a perimeter of the pen 10 can be, in one or more arrangements, about 2 feet by about 4 feet. In one or more arrangements, the perimeter of the pen 10 can be about 4 feet by about 4 feet. In one or more arrangements, the perimeter of the pen 10 can be about 6 feet by about 4 feet. In one or more arrangements, the pen 10 can be available in a plurality of predetermined sizes. Again, these perimeter dimensions of the pen 10 are provided merely as examples. It will be understood that the pen 10 can have any suitable size, shape, and/or configuration. In some arrangements, the pen 10 can be configured and/or expanded to have any desired size, shape, and/or configuration. In one or more arrangements, the size of the pen 10 can be selectively configured by an end user. In one or more arrangements, the length and width of the pen 10 can be sized for small dogs and/or medium dogs.

The pen 10 can have any suitable height. For instance, in one or more arrangements, the pen 10 can be from about 1 foot high to about 6 feet high. In one or more arrangements, the pen 10 can be from about 2 feet high to about 4.5 feet high. In one or more arrangements, the pen 10 can be about 2 feet high, about 2.5 feet high, about 3 feet high, about 3.5 feet high, about 4 feet high, or about 4.5 feet high, just to name a few possibilities. However, it will be understood that the height of the pen 10 can be greater or less than any of these example heights. The height of the pen 10 can be selected based on the individual animal being contained within the pen 10. In one or more arrangements, the height of the pen 10 can be sized for small dogs and/or medium dogs. In one or more arrangements, the walls 20 of the pen 10 can be substantially the same height. In one or more arrangements, one or more of the walls 20 can have a different height than one or more of the other walls 20.

The walls 20 of the pen 10 can be formed in any suitable manner. For instance, the walls 20 can be formed by one or more wall panels 22. The wall panels 22 can have any suitable size, shape, and/or configuration. In one or more arrangements, the wall panels 22 can be substantially rectangular. However, the wall panels 22 can be different shapes. For instance, the wall panels 22 can be substantially polygonal, substantially triangular, substantially square, substantially circular, substantially oval, and/or combinations thereof, just to name a few possibilities. In one or more arrangements, one or more corners and/or one or more edges of the wall panels 22 can be rounded, filleted, beveled, and/or chamfered. In at least some instances, such arrangements can minimize sharp corners for safety purposes and/or to reduce stress concentrations.

The wall panels 22 can be made of any suitable material. For instance, the wall panels 22 can be made of acrylic. As another example, the wall panels 22 can be made of polycarbonate. As a further example, the wall panels 22 can be made of glass. Still further, the wall panels 22 can be made out of any suitable plastic. In one or more arrangements, the wall panels 22 can be made of any combination of materials, including any of those noted above and/or other materials.

In one or more arrangements, one or more of the wall panels 22 can be transparent. In one or more arrangements, all of the wall panels 22 can be transparent. In one or more arrangements, one or more of the wall panels 22 can be translucent. For instance, one or more the wall panels 22 can be highly translucent, that is, translucent with a high amount of light transmission (e.g., allowing at least about 70%, at least about 75%, at least about 80%, at least about 85%, at least about 90%, at least about 95%, at least about 96%, at least about 97%, at least about 98%, or at least about 99% light transmission). As another example, one or more of the wall panels 22 can be translucent with a low amount of light transmission (e.g., allowing about 20% or less light transmission, about 15% or less light transmission, about 10% or less light transmission, about 5% or less light transmission, about 4% or less light transmission, about 3% or less light transmission, about 2% or less light transmission, or about 1% or less light transmission). In one or more arrangements, one or more of the wall panels 22 can be opaque. One or more of the wall panels 22 can be clear. In one or more arrangements, one or more of the wall panels 22 can be tinted one or more colors.

The plurality of wall panels 22 can be substantially identical to each other. Alternatively, one or more of the wall panels 22 can be different from the other wall panels 22 in one or more respects, including any of those described herein. In one or more arrangements, there can be a first group of wall panels 22 and a second group of wall panels 22. In such case, the first group of wall panels 22 can be substantially identical to each other, and the second group of wall panels 22 can be substantially identical to each other. In one or more arrangements, the first group of wall panels 22 can form a substantially parallel pair of walls 20 of the pen 10, and the second group of wall panels 22 can form the a substantially parallel pair of walls 20 of the pen 10.

The pen 10 can include a frame 30. The frame 30 can be made of a plurality of frame members 32. The frame members 32 can have any suitable configuration. In one or more arrangements, the frame members 32 can be substantially straight. In one or more arrangements, the frame members 32 can be non-linear in one or more respects, such as by including one or more curves, bends, angles, and/or other non-straight feature. The frame members 32 can have an associated longitudinal direction 36.

The frame members 32 can be tubular. The frame members 32 can have any suitable cross-sectional shape. For instance, the frame members 32 can be substantially circular. However, it will be understood that other cross-sectional shapes are possible. For instance, the frame members 32 can be substantially rectangular, substantially triangular, substantially polygonal, substantially oval, substantially obround, substantially oblong, and/or any combination thereof, just to name a few possibilities. In one or more arrangements, the frame members 32 can be hollow or at least partially hollow. In one or more arrangements, the frame members 32 can be substantially solid or otherwise substantially non-hollow.

The frame members 32 can be made of any suitable material. In one or more arrangements, the frame members 32 can be made of a metal or alloy, such as aluminum. As an example, the frame members 32 can be extruded aluminum tubes. In one or more arrangements, the frame members 32 can be made of wood. As an example, the frame members 32 can be wood dowels. In some arrangements, the frame members 32 can be made of plastic or a composite material. Of course, the frame members 32 can be made of a plurality of different materials.

The plurality of frame members 32 can be interconnected to form the frame 30. The plurality of frame members 32 can be interconnected in any suitable manner. For instance, the plurality of frame member 32 can be interconnected using a plurality of connectors 40. The connectors 40 can be made of any suitable material. For example, the connectors 40 can be made of plastic or metal, just to name a few possibilities.

Figure 2:
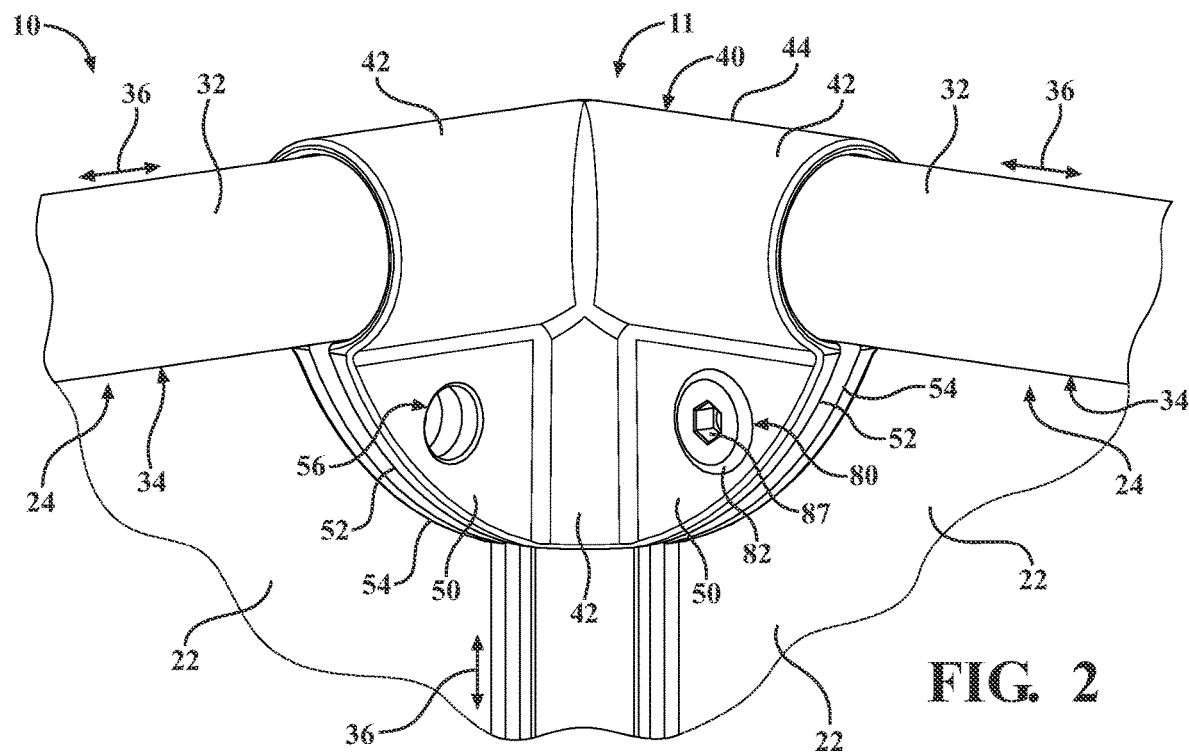
FIG. 2 is a view of a portion of the pen, showing an example of a corner connector.

The connectors 40 can be any suitable type of connector. Various non-limiting examples of the connectors 40 will be described herein. FIG. 2 shows an example of a corner connector 44. The corner connector 44 can be configured to interconnect a plurality of frame members 32 that meet at a corner of the pen 10. In the arrangement shown in FIG. 2, the corner connector 44 can be configured to interconnect three frame members 32 that meet at a corner 11 of the pen 10.

The corner connectors 44 can include a plurality of frame member engagement portions 42. In one or more arrangements, the connectors 40 can have three frame member engagement portions 42. The three frame member engagement portions 42 can be arranged at substantially 90 degrees relative to each other. However, it will be understood that the quantity and/or arrangement of the frame member engagement portions 42 can be varied depending on the geometry of the pen 10. For instance, in some arrangements, the corner connectors 44 or other connectors 40 can have more than three frame member engagement portions 42.

The frame member engagement portions 42 can be configured to engage the frame members 32 in any suitable manner. For instance, in one or more arrangements, the frame member engagement portions 42 can be configured to receive a portion of the frame members 32. In one or more arrangements, the frame member engagement portions 42 can be configured to be received within the frame members 32. In one or more arrangements, the frame member engagement portions 42 can be configured to abut the frame members 32.

Figure 3:
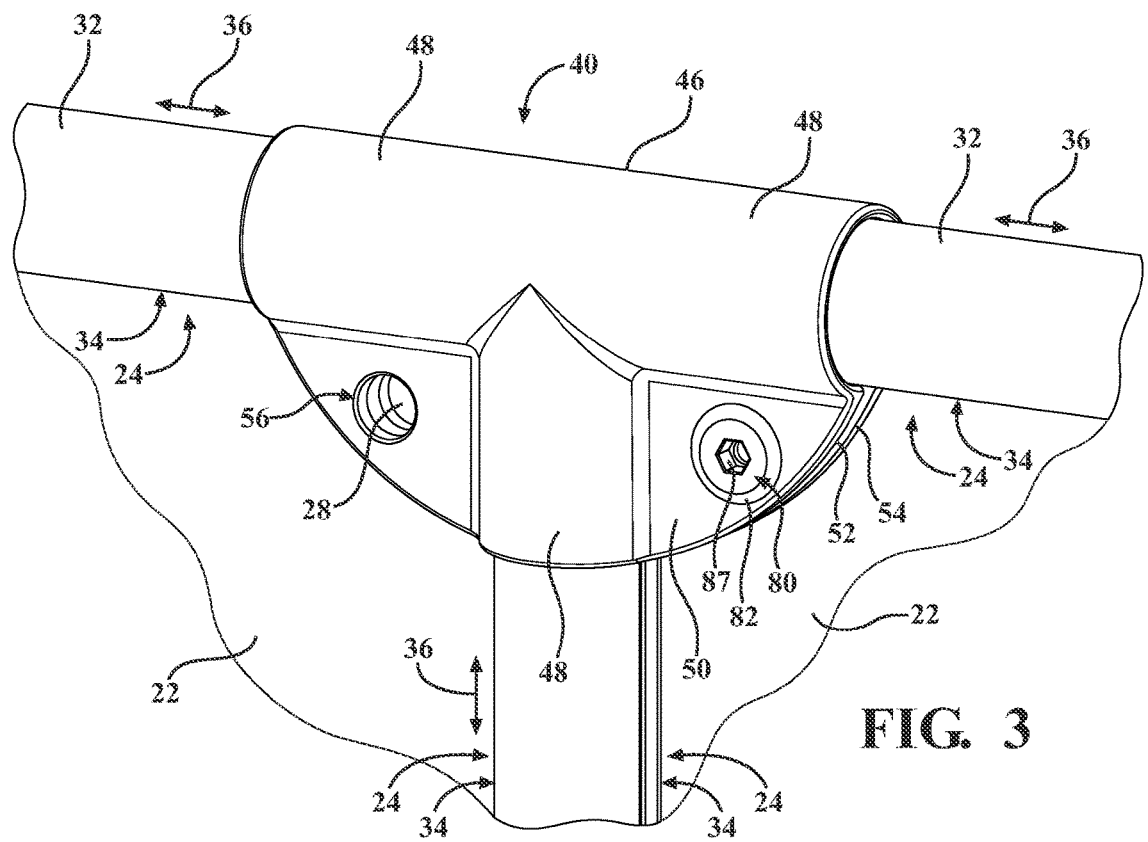
FIG. 3 is a view of a portion of the pen, showing an example of a straight connector.

FIG. 3 shows an example of a straight connector 46 for the pen 10. The straight connector 46 can be configured to interconnect a plurality of frame members 32 that meet along the length of the walls 20 the pen 10. In the arrangements shown in FIG. 3, the straight connector 46 can be configured to interconnect three frame members 32 that meet along the length of the walls 20 of the pen 10.

The straight connectors 46 can include a plurality of frame member engagement portions 48. In one or more arrangements, the connectors 40 can have three frame member engagement portions 48. Two of the three frame member engagement portions 48 can be substantially aligned with each other, and the other frame member engagement portion 48 can be substantially perpendicular to the two substantially aligned frame member engagement portions 48. However, it will be understood that the quantity and/or arrangement of the frame member engagement portions 48 can be varied depending on the geometry of the pen 10. For instance, in some arrangements, the straight connectors 46 or other connectors 40 can have more than three frame member engagement portions 48.

The frame member engagement portions 48 can be configured to engage the frame members 32 in any suitable manner. For instance, in one or more arrangements, the frame member engagement portions 48 can be configured to receive a portion of the frame members 32. In one or more arrangements, the frame member engagement portions 48 can be configured to be received within the frame members 32. In one or more arrangements, the frame member engagement portions 48 can be configured to abut the frame members 32.

The frame members 32 can frictionally engage the connectors 40. There can be additional and/or alternative forms of engagement. For example, there can be engagement between the frame members 32 and the connectors 40 by one or more fasteners (e.g., screws, bolts, pins, clips, etc.) and/or one or more adhesives.

In some arrangements, the engagement between the connectors 40 and the frame members 32 can fix the frame members 32 in place such that there is substantially no relative movement between the connectors 40 and the frame members 32. In some arrangements, some relative movement between the frame members 32 and the connectors 40 can be permitted. For instance, in one or more arrangements, the frame members 32 can move along their longitudinal direction 36 within the connectors 40. As an example, the frame members 32 can move from about 1 to about 2 millimeters within the connectors 40.

The plurality of frame members 32 can be configured to engage the wall panels 22. Any suitable form of engagement can be provided. In one or more arrangements, at least some of the frame members 32 can include a slot 34 extending along the longitudinal direction 36 of the frame member 32. In one or more arrangements, all of the frame members 32 can include a slot 34 extending along the longitudinal direction 36 of the frame member 32. The slot 34 can open to an exterior of the frame member 32.

Figure 9:
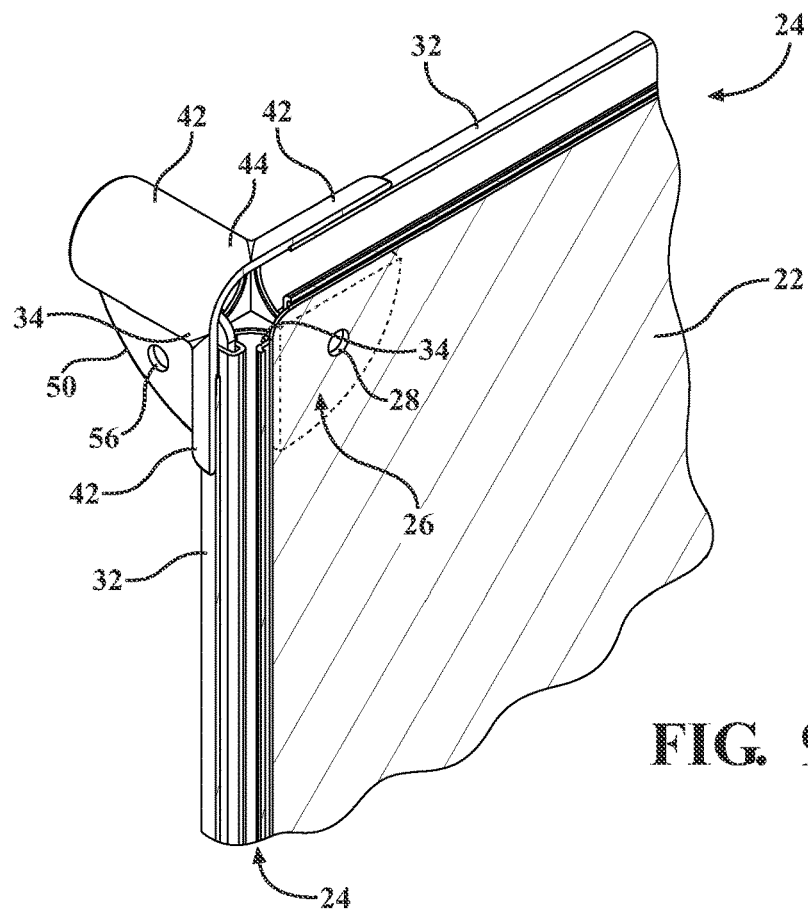
FIG. 9 is a cross-sectional view of a corner portion of the pen, wherein the fasteners are not shown for clarity.

In one or more arrangements, the slot 34 can extend at least a portion of the length of the frame member 32. In one or more arrangements, the slot 34 can extend the entire length of the frame member 32. In some instances, an edge region 24 of the wall panel 22 can be received in a respective one of the slots 34, as is shown in FIG. 9. The frame members 32 can be positioned so that the slot 34 faces inward toward the plane of the respective wall 20. In one or more arrangements, at least some of the frame members 32 can have more than one slot 34. For instance, the frame members 32 that extend substantially vertically in the frame 30 can have two slots 34. In such case, the slots 34 can have any suitable orientation with respect to each other. For example, with respect to a substantially vertical frame member 32 that is in an intermediate location along a wall 20, the two slots 34 can be aligned with each other on opposite sides of the frame member 32. As another example, with respect to a substantially vertical frame member 32 that is in a corner, the two slots 34 can be oriented at substantially 90 degrees with respect to each other, as is shown in FIG. 9.

Figure 11:
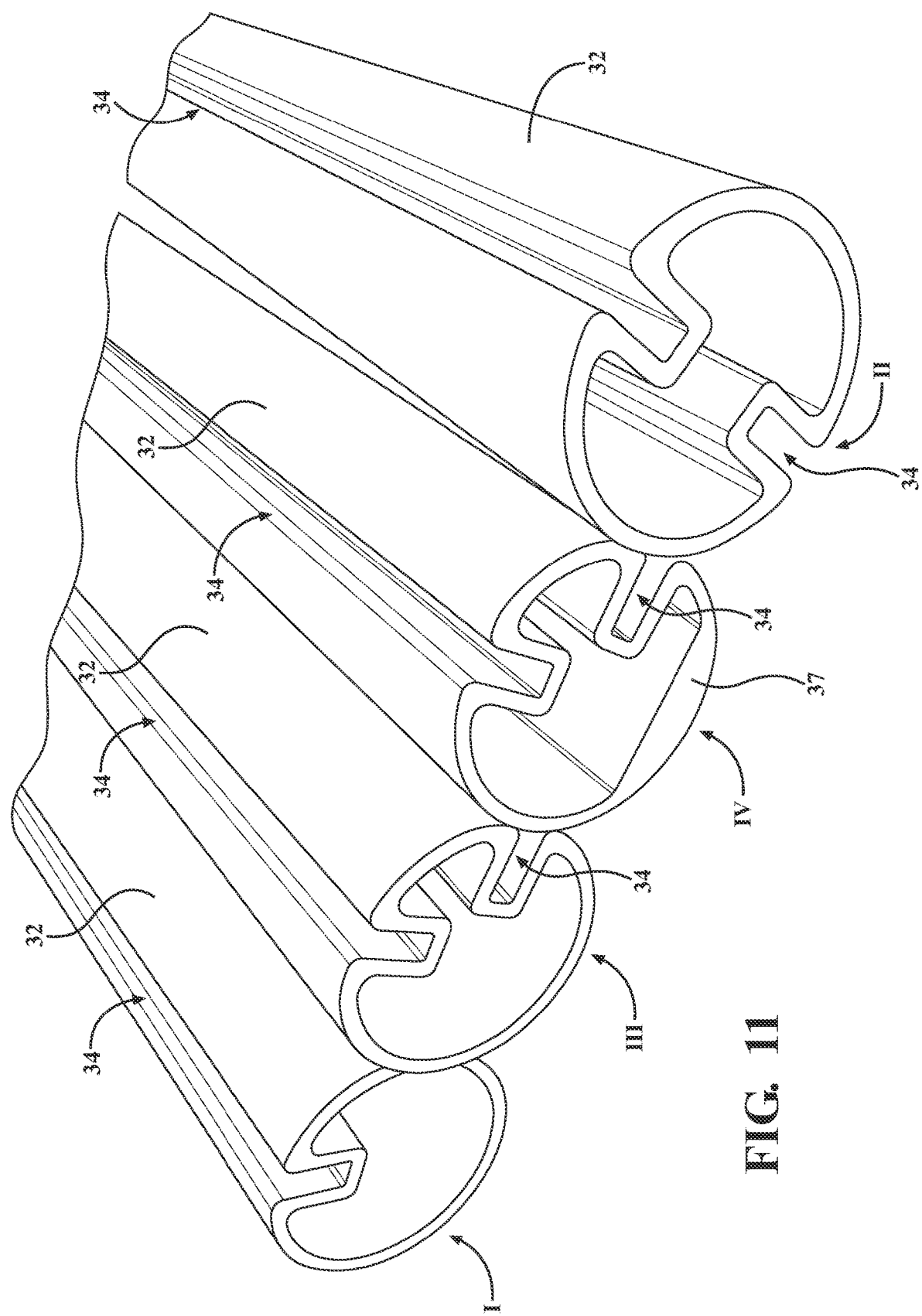
FIG. 11 shows examples of a plurality of different types of frame members.

The frame members 32 can be substantially identical to each other. Alternatively, one or more of the frame members 32 can be different from the other frame members 32 in one or more respects, including any of those described herein. Referring to FIG. 11, examples of different types of the frame members 32 are shown, including a first type I, a second type II, a third type III, and a fourth type IV.

The frame member 32 of the first type I can include a single slot 34. The first type I of frame member 32 can be used to form the substantially horizontal portions of the frame 30. The frame member 32 of the second type II can include two slots 34. The two slots 34 can be substantially aligned with each other. The two slots 34 can open to opposite portions of the frame member 32. More particularly, the two slots 34 can open in directions that are at about 180 degrees relative to each other. The second type II of frame member 32 can be used to form the intermediate, substantially vertical portions of the frame 30 (e.g., the substantially vertical frame members 32 that do not form a corner of the pen 10). The third type III of frame member 32 can have two slots 34. The two slots 34 can be oriented transverse to each other. For instance, the two slots 34 can be oriented and/or can open at substantially 90 degrees relative to each other. The third type III of frame member 32 can be used to form the substantially vertical, corner portions of the frame 30. The fourth type IV of frame member 32 can be used to form a substantially vertical, corner portion of the frame 30 to which a door 60 is attached, such as by hinges 64. The fourth type IV of frame member 32 can be substantially similar to the third type III of frame member, but it can include an extra material region 37 on an inner side of the frame member 32. The extra material region 37 can provide additional material into which tapped holes can be formed. These tapped holes can receive a fastener to more securely hold the hinges 64 in place, which, in turn, can help to more securely support the door 60.

However, it will be understood that arrangements described herein are not limited to the particular frame members 32 shown in FIG. 11 or in any other figure. Additional and/or alternative types of frame members 32 are possible. For instance, the frame members 32 can have greater or fewer slots and/or the slots can be oriented at different angles relative to each other than those shown.

In one or more arrangements, the connectors 40, including the corner connectors 44 and/or the straight connectors 46, can include one or more webs 50 (see, e.g., FIGS. 2 and 3). Each web 50 can connect between the two of the frame member engagement portions 42 or 48. In one or more arrangements, one or more of the webs 50 can include a slot 52 opening to an outer edge 54 of the web 50. The slot 52 can be configured to receive a corner portion 26 of the wall panel 22 (see FIG. 9). When the pen 10 is assembled, the slot 52 in the web 50 can be substantially aligned with the slots 34 of the frame members 32 that are in engagement with the frame member engagement portions 42 or 48 connected by the web 50. However, in some arrangements, the corner connectors 44, the straight connectors 46, and/or other types of the connectors 40 may not have webs.

Figure 10:
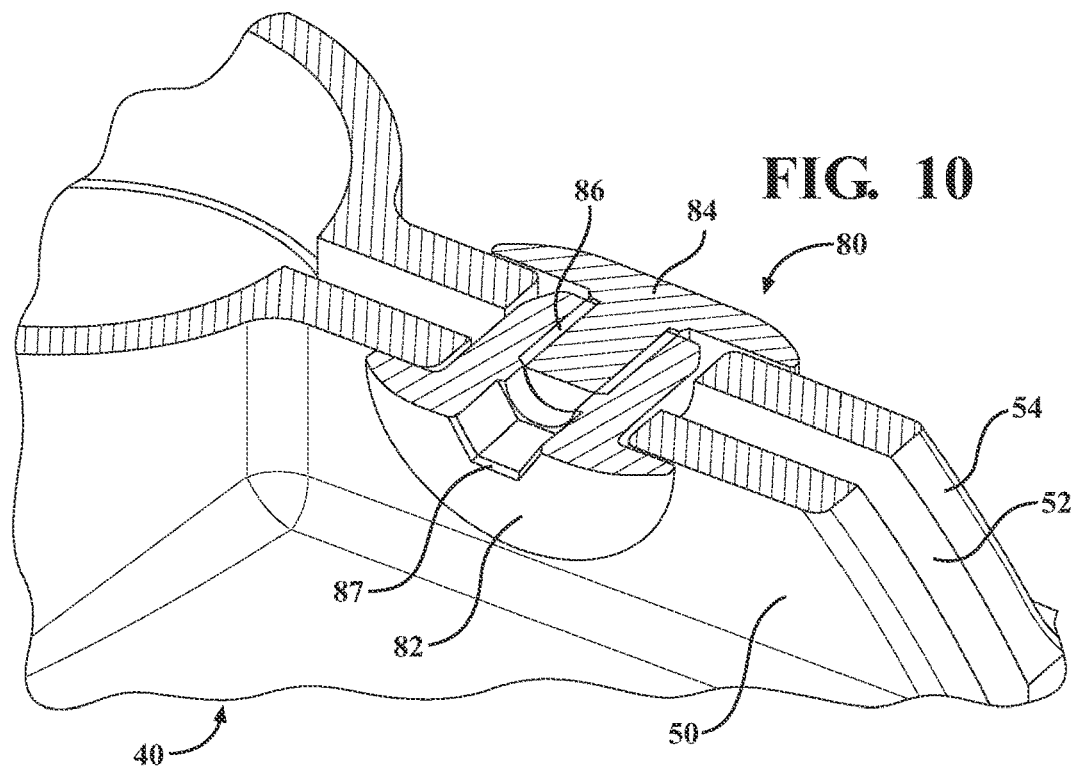
FIG. 10 is a cross-sectional view of an example of a portion of the pen, showing an attachment between a connector and a wall panel using a fastener and wherein the wall panel and frame member are not shown for clarity.

Referring to FIG. 9, an aperture 56 can be defined in the web 50. An aperture 28 can be provided in the corner portion 26 of the wall panel 22. Thus, when the corner portion 26 of the wall panel 22 is received in the slot 52 of the connector 40, the apertures 56, 28 can be substantially aligned with each other. In one or more arrangements, a fastener can be received in the aligned apertures 56, 28 to attach the connectors 40 to the wall panels 22. Any suitable fastener can be used. FIG. 10 shows one example of a fastener 80. The fastener 80 can include a first portion 82 and a second portion 84. The first portion 82 and the second portion 84 can be received in opposite ends of the aligned apertures 56, 28. The first portion 82 and the second portion 84 can be operatively connected in any suitable manner, such as by threads 86, mechanical engagement, and/or adhesives, just to name a few possibilities. At least one of the first portion 82 and the second portion 84 can be configured for engagement by a tool. As an example, in one or more arrangements, only the first portion 82 can include a hexagonal hole 87 to receive a tool.

Figure 4:
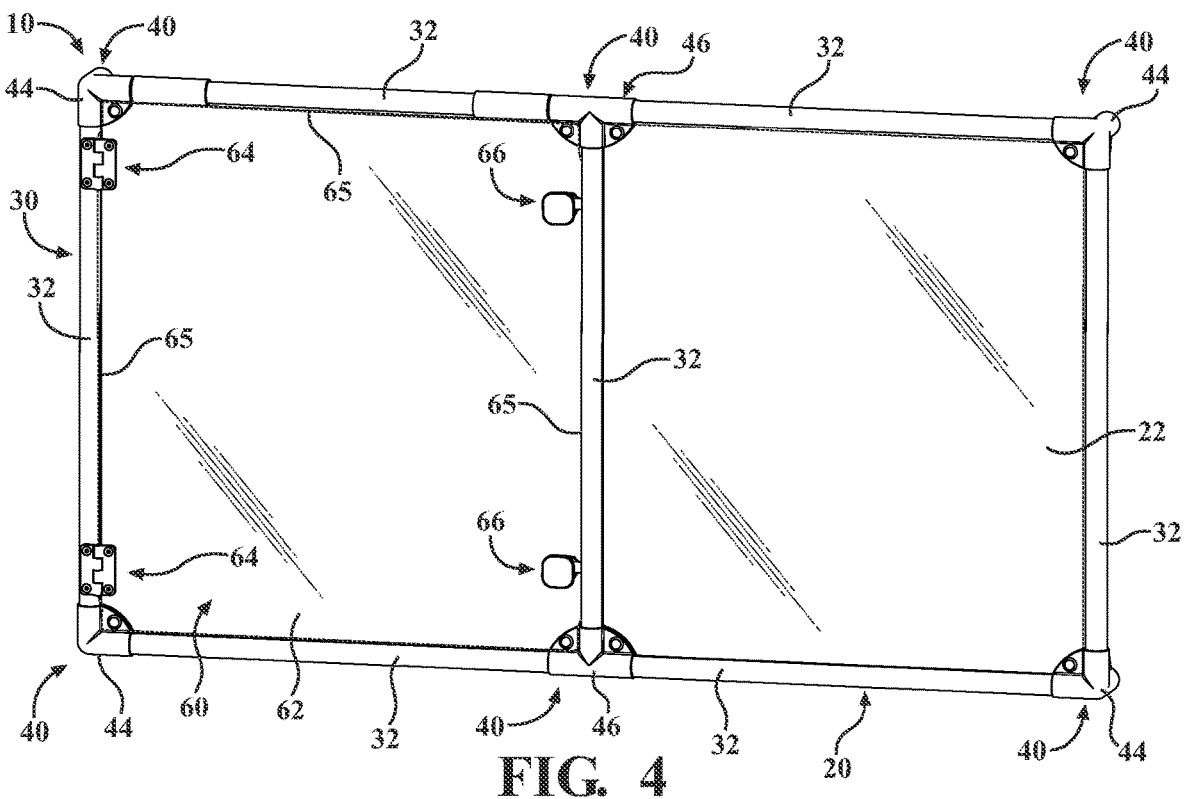
FIG. 4 is an example of a wall of the pen, including a door.

Referring to FIG. 4, one of the walls 20 of the pen 10 can include a door 60. The door 60 can be formed by a door panel 62. The door panel 62 can be substantially identical to the wall panels 22, or it can be different in one or more respects.

Figure 5:
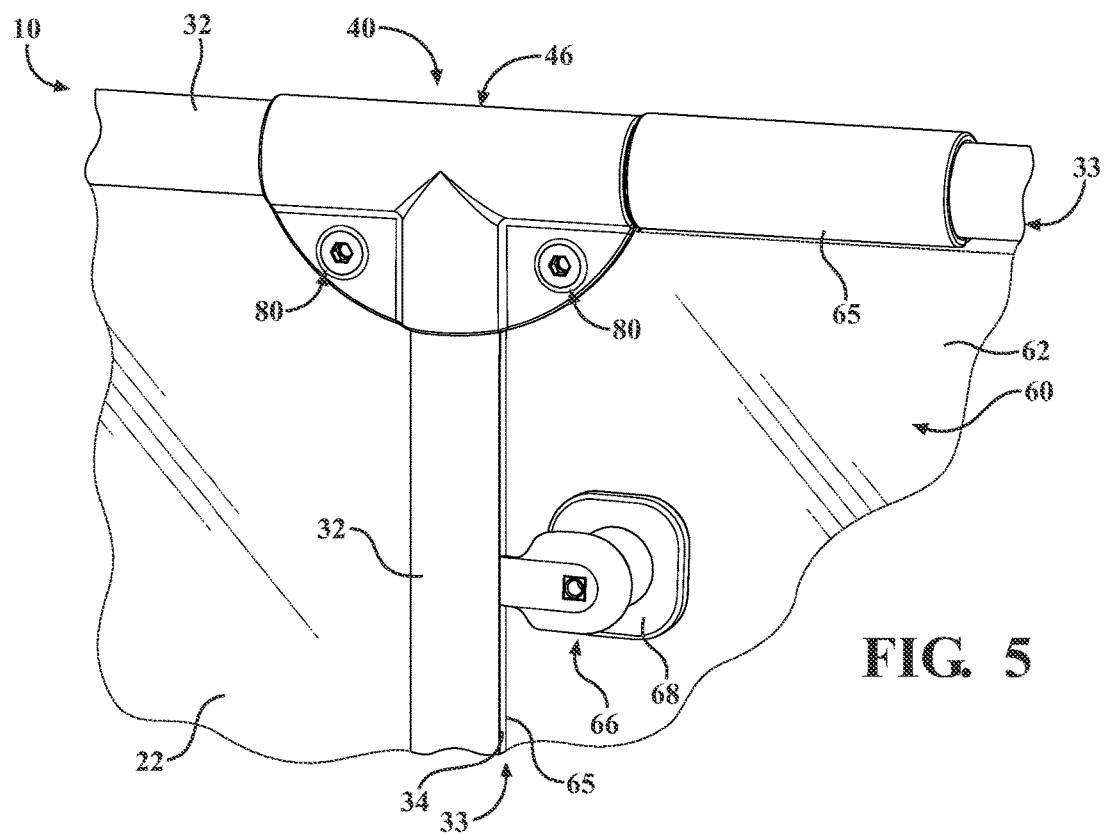
FIG. 5 is a view of a portion of the pen, showing an example of the door in a closed, locked configuration.
Figure 6:
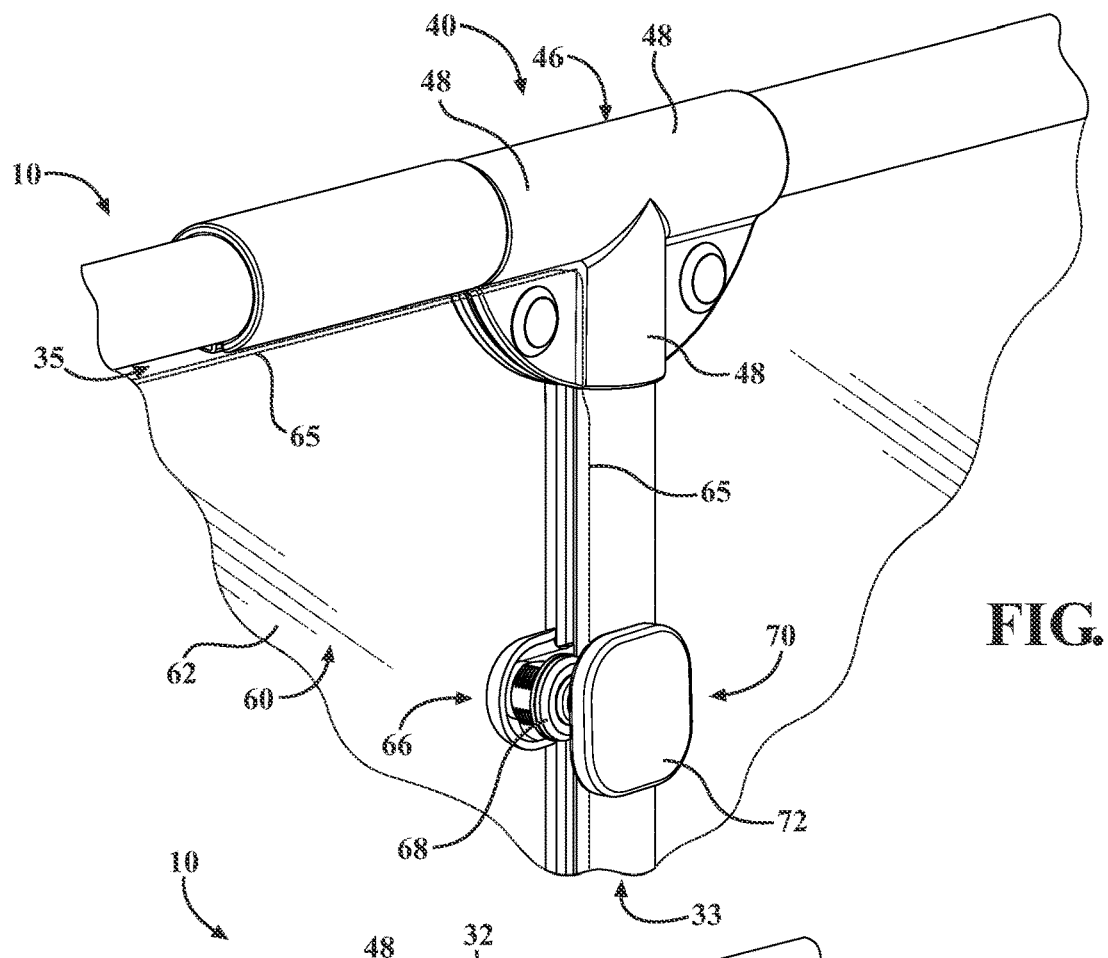
FIG. 6 is a view of a portion of the pen, showing an example of a user interface element to allow a user to selectively lock and unlock the door.
Figure 7:
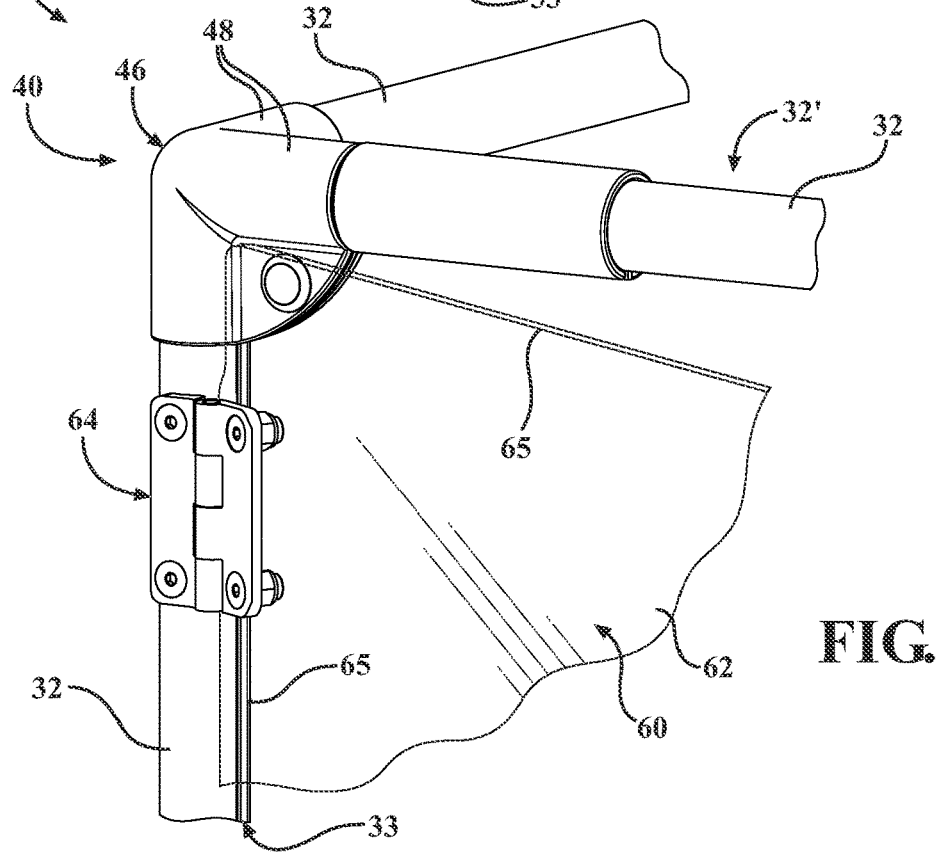
FIG. 7 is an example of a door panel operatively connected to a frame member by a hinge.
Figure 8:
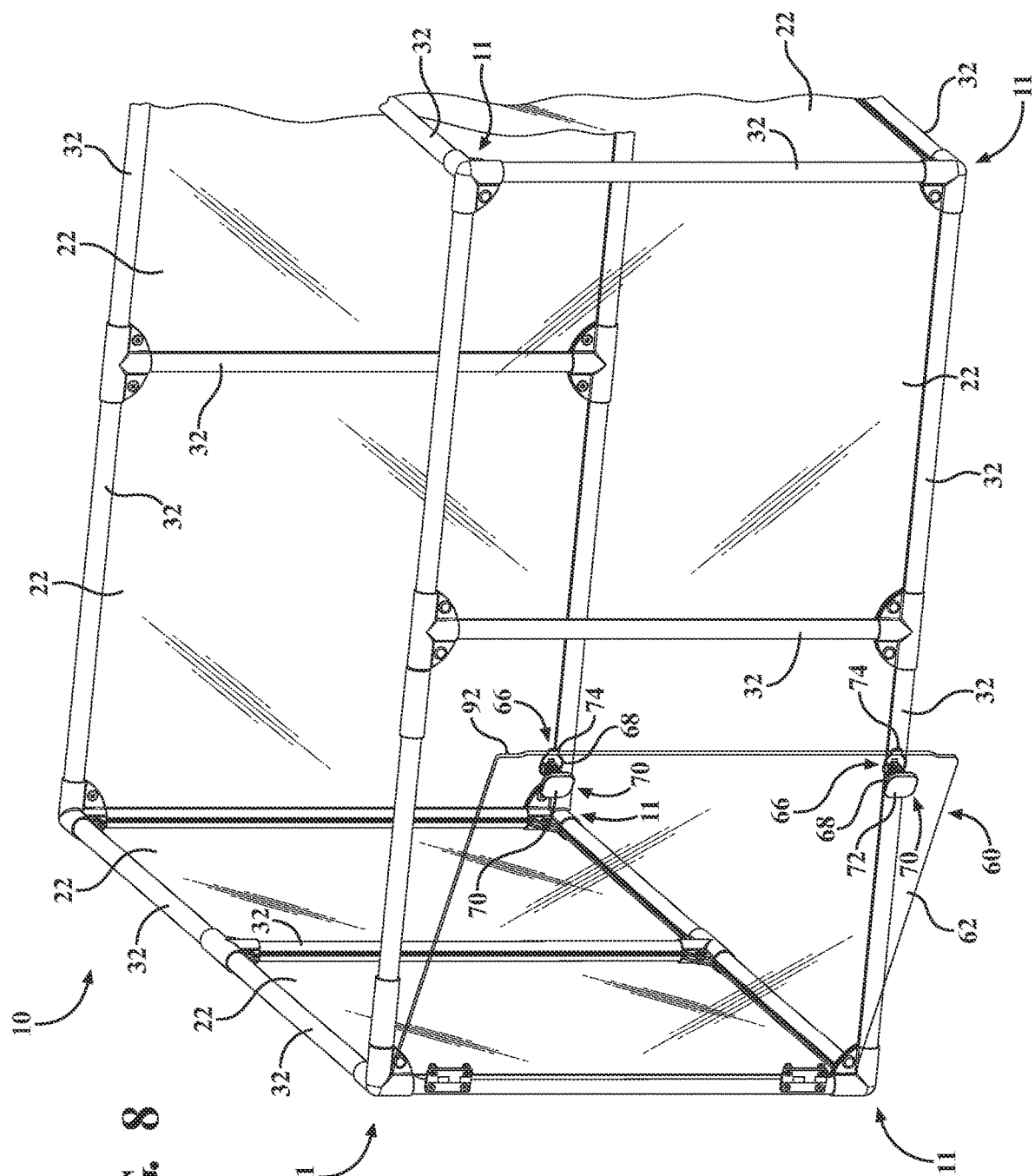
FIG. 8 is an example of the pen, showing the door in an open configuration.

The door 60 can be selectively opened and closed by a person (e.g., a pet owner). FIG. 8 shows an example of the door 60 in an open configuration. FIGS. 1, 5, and 6 show an example of the door 60 in a closed configuration. The door 60 can be movably connected to the pen 10 in any suitable manner, now known or later developed. For example, in one or more arrangements, the pen 10 can be configured to allow the door 60 to be selectively opened and closed by sliding. As another example, referring to FIGS. 4, 7, and 8, the door 60 can be pivotably attached and/or hingedly attached to the pen 10. In one or more arrangements, one or more hinges 64 can be operatively connected to the door 60, such as at or near an edge 65 of the door panel 62. The one or more hinges 64 can also be operatively connected to one or more of the frame members 32. The operative connection between the one or more hinges 64 and the door panel 62 and/or the frame member(s) 32 can be achieved using one or more fasteners. Any suitable fasteners can be used, including, for example, one or more screws, bolts, adhesives, and/or mechanical engagement, just to name a few possibilities. The door panel 62 and/or the frame member 32 can include apertures to facilitate such operative connection. The term "operatively connected," as used throughout this description, can include direct or indirect connections, including connections without direct physical contact. In one or more arrangements, the door 60 can be configured as a saloon door, with two door panels pivotably attached and/or hingedly attached to the pen 10.

In one or more arrangements, the door 60 can be biased toward the closed configuration. For instance, one or more springs, one or more closers, or one or more other biasing elements can be operatively connected to the door 60 and/or frame member(s) 32.

Alternatively or in addition, the door 60 can be configured to be selectively locked and unlocked. In such case, the door 60 can include one or more locking elements. As an example, the door 60 can include one or more latches 66. FIGS. 4-6 and 8 shows an example of a latch 66 for the door 60. The one or more latches 66 can be any type of latch, now known or later developed.

The one or more latches 66 can be operatively connected to the door 60 in any suitable manner. For instance, referring to FIG. 8, the latch 66 can pass through an aperture 68 in the door panel 62. On an outer side 90 of the door panel 62, a user interface element 70 (e.g., a knob 72, dial, handle, button, slider, etc.) can be provided. The user interface element 70 can be operatively connected to a latching member 74, which can be located on the inner side 92 of the door panel 62. The latching member 74 can be movable in response to user input. Thus, when a user engages the user interface element 70, the latching member 74 can move between a locked position and an unlocked position. FIGS. 5 and 6 show an example of a locked position in which the latching member 74 is received within the slot 34 in one of the frame members 32. As a result, the door 60 cannot be opened. However, in an unlocked position, the latching member 74 can be moved out of the slot 34, thereby allowing the door 60 to be opened, as is shown in FIG. 8. The latch 66 and/or the latching member 74 can be configured to have smooth and/or rounded edges and/or corners. Such a configuration can help to prevent dogs or other animals within the pen 10 from hurting their noses or other portions of their bodies if they try to open the door 60 or otherwise brush up against it.

It should be noted that the door panel 62 is operatively connected to the frame 30 by the one or more hinges 64 or other elements. In one or more arrangements, the door panel 62 can be operatively connected to a substantially vertical frame member 32 that defines a corner 11 of the pen 10. In such case, the wall that is substantially perpendicular to the door 60 when closed can support the weight of the door 60 when it is opened at about 90 degrees. When then door 60 opened at about 180 degrees, the wall that is substantially parallel to the door 60 when closed can support the weight of the door 60. The use of a reinforcing member 200 (see FIG. 21) can also help to prevent the door 60 from sagging when opened, particularly when the door 60 is open at about 180 degrees and the top frame member 32' (FIG. 1) is also open.

However, the door panel 62 is not received in the slots 34 of the frame members 32. As a result, there can be a spacing 33 between the edges 65 of the door panel 62 and the frame members 32. Likewise, the corners of the door panel 62 can be chamfered or angled so that they are not received in the slots 52 of the connectors 40. As a result of such arrangements, the door panel 62 can be opened and closed without interference from the frame 30.

In one or more arrangements, the corners of the door panel 62 do not clear the webs 50 of the connectors 40 at the corners of the door panel 62. Thus, when in a closed configuration, the door panel 62 can contact or be substantially adjacent to an outward facing side of the webs 50 of the connectors 40 at the corners of the door panel 62. In this way, the webs 50 can stop the door 60 from swinging into the pen 10. However, as noted above, there may be arrangements in which the connectors 40 do not include webs 50. In such case, the range of motion of the door panel 62 can be limited in other ways, or the door panel 62 can be selectively opened into or out of the pen 10.

The pen 10 can be provided to a user in various forms. For instance, in one or more arrangements, the pen 10 can be provided to consumers in an unassembled state. Most or all of the individual components of the pen 10 can be manufactured and packaged in an unassembled state. Thus, for example, the wall panels 22, the frame members 32, the connectors 40, and/or the fasteners 80 (and/or other fasteners) can be unassembled. In some arrangements, the door 60 can be provided in an unassembled state. In some arrangements, the door 60 can be at least partially assembled prior to being packaged for sale or shipping. In such case, one or more hinges 64 and/or one or more latches 66 can be assembled with the door panel 62. The pen 10 can be assembled by a purchaser of the product In one or more arrangements, the pen 10 can be configured for indoor use only. In some arrangements, the pen 10 can be configured to indoor and outdoor use.

In one or more arrangements, the pen 10 can be configured so that it is collapsible. The pen 10 can be collapsible in any manner, now known or later developed. The pen 10 can be collapsible so that its overall footprint can be reduced by a person without disassembly and/or without using tools. In one or more arrangements, at least some of the connectors 40 can be configured to allow each wall panel 22 to pivot and/or hinge at one of the substantially vertical frame members 32.

In one or more arrangements, the pen 10 can be configured so that it is not readily collapsible. In one or more arrangements, the pen 10 can be "not readily collapsible" in that it is configured so that the overall footprint of the pen 10 can only be reduced by disassembly. Alternatively or in addition, the pen 10 can be "not readily collapsible" in that its disassembly requires the use of tools and, more particularly, its disassembly requires the use of tools to avoid breaking the pen 10. In one or more arrangements, the pen 10 can be "not readily collapsible" in that, other than the door panel 62, the walls 20 and/or wall panels 22 cannot substantially move and/or are otherwise substantially fixed relative to each other when the pen 10 is assembled.

In one or more arrangements, the pen 10 can be configured so that it is portable. The pen 10 can be portable in any manner, now known or later developed. In one or more arrangements, the pen 10 can be sufficiently lightweight to enable it to be carried by a person (e.g., about 60 pounds or less, about 50 pounds or less, about 40 pounds or less, etc.). Alternatively or in addition, the pen 10 can be collapsible, as noted above. When in a collapsed configuration, the pen 10 can be sufficiently compact in size and/or shape so that it can be readily carried by a single person and, more particularly, so that it can be readily carried by a single person without using some other form of assistance. Alternatively or in addition, when in a collapsed configuration, the pen 10 can fit within the typical cargo space of most passenger vehicles (e.g., sedans, coupes, pick-up trucks, mini-vans, vans, etc.). Still further, the pen 10 can include one or more features to facilitate transport, such as handles, straps, grips, wheels, and/or other feature.

In one or more arrangements, the pen 10 can be configured so that it is not readily transportable. In one or more arrangements, the pen 10 can be "not readily transportable" in that, when assembled, the pen 10 cannot fit within the typical cargo space of most passenger vehicles (e.g., sedans, coupes, pick-up trucks, mini-vans, vans, etc.). Alternatively or in addition, in one or more arrangements, the pen 10 can be "not readily transportable" in that, when assembled or disassembled, the pen 10 cannot be easily carried by a single person without using some other form of assistance.

The pen 10 can include various other features. For instance, in some arrangements, the pen 10 can include a top portion. The top portion can cover at least a portion of the open top 14 of the pen 10. The top portion can have any suitable configuration. In one or more arrangements, the top portion can be a panel made of the same material as the plurality of wall panels 22. In one or more arrangements, the top portion can be made of a different material than the wall panels 22. For instance, the top portion can be made of a screen-like material, a perforated material, and/or a textile. In one or more arrangements, the top portion can be configured to prevent or reduce the likelihood that an animal within the pen 10 will escape through the open top 14.

In one or more arrangements, the top portion can extend substantially horizontally when installed. In one or more arrangements, the top portion can be angled relative to horizontal when installed. The top portion can be attached to the pen 10 in any suitable manner, such as by one or more fasteners, one or more forms of mechanical engagement, one or more adhesives, and/or combinations thereof, just to name a few possibilities.

In some arrangements, there can be alternative or additional ways of preventing or reducing the likelihood that an animal within the pen 10 will escape through the open top 14. As an example, there can be a physical structure (e.g., mechanical addition, wall extension, etc.) that can be added along at least a portion of the top edge of the frame 30. In one or more arrangements, a plurality of elements can extend upwardly from along at least a portion of the top edge of the frame 30. Such elements can extend at angle relative to vertical in a direction into and/or out of the pen 10. In one or more arrangements, at least some of the frame members 32 (e.g., the top, substantially horizontal frame members) can be configured to rotate about their longitudinal axis. Alternatively or in addition, one or more of the walls 20 can be configured to make them somewhat unstable when they are pushed on by an animal, as animals may avoid pushing on things they feel are unstable.

Alternatively or in addition, the pen 10 can include a floor portion. The floor portion can be configured to protect the underlying floor or surface upon which the pen 10 is supported. The floor portion can cover at least a portion of the open bottom 16 of the pen 10. The floor portion can have any suitable configuration. In one or more arrangements, the floor portion can be a covering or a tray. In one or more arrangements, the floor portion can be a panel made of the same material as the plurality of wall panels 22. Alternatively, the floor portion can be made of some other material, such as, for example, plastic, metal, wood, or textile.

Alternatively or in addition, the pen 10 can include one or more separation walls. The separation walls can be used to divide the space 12 enclosed by the pen 10 into sections. The separation walls can be the same as the wall panels 22, or they can be different in one or more respects. As an example, the separation walls can be opaque. In one or more arrangements, when the pen 10 is divided into sections, each section can have a door 60. In some instance, the separation walls can be used, for example, in a pet store, a kennel, or in a home with multiple pets.

In one or more arrangements, the pen 10 can include one or more fixtures or features to support one or more animal-related accessories. For instance, if the animal is a dog, then examples of such accessories can include food bowls, water bowls, treat dispensers, and/or toys, just to name a few possibilities. Alternatively or in addition, the pen 10 can include a custom made dog bed or pad sized to fit the pens. In some arrangements, the pen 10 can include holders and/or attachments for electronic devices, such as tablet computers, cell phones, smart phones, speakers, microphones, music devices, cameras, displays, and/or video monitors, just to name a few possibilities.

In some arrangements, the pen 10 can be provided in a plurality of predetermined sizes. For instance, a small size can be approximately 2'×4'. A medium size can be approximately 4'×4'. The medium size can include two additional wall panels 22 relative to the small size. The medium size can include additional hardware to support the additional wall panels 22 (e.g., frame members 32, connectors 40, etc.).

A large size can be approximately 6'×4'. The large size can include two additional wall panels 22 relative to the medium size. The large size can include additional hardware to support the additional wall panels 22 (e.g., frame members 32, connectors 40, etc.). In one or more arrangements, the various size of the pen 10 can include a single door 60. The door 60 can be positioned at various locations around the perimeter of the pen 10. In one or more arrangements, a plurality of doors 60 can be provided. In some instances, expansion kits can be offered for sale. The expansion sets can include additional wall panels 22 and additional hardware to support the additional wall panels 22 (e.g., frame members 32, connectors 40, etc.). The expansion set can allow an owner to expand the pen to various sizes and/or configurations.

In one or more arrangements, a top frame member 32' of the door panel 62 (see FIG. 1) can be configured to that it is removable or movable out of the way of a person, thereby allowing a person can walk directly into the space 12 enclosed by the pen 10. Such a configuration can enable easier access into and out of the pen 10. For example, such a configuration can help a person avoid having to step over the walls 20 of the pen 10. As another example, such a configuration can make it easier for older or mobility challenged individuals to get into and/or out of the pen 10.

There are various ways in which such a walk through door can be provided. One example is shown in FIGS. 12-26. In this example, the top frame member 32' can be configured to be movable out of the way to allow a person to access the interior of the pen 10. FIG. 26 shows an example of the pen 10 when the top frame member 32' has been moved to an open position.

Figure 25:
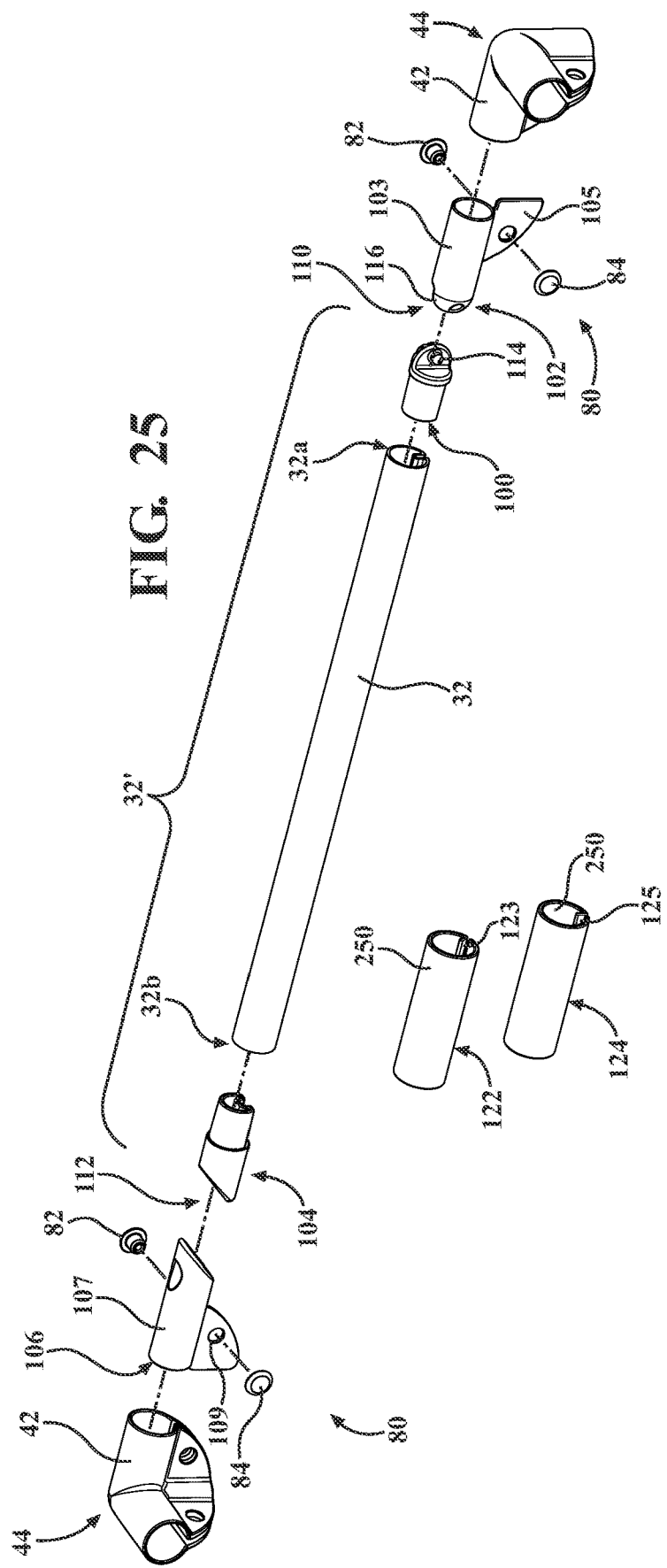
FIG. 25 is an exploded view of the movable top frame member.
Figure 26:
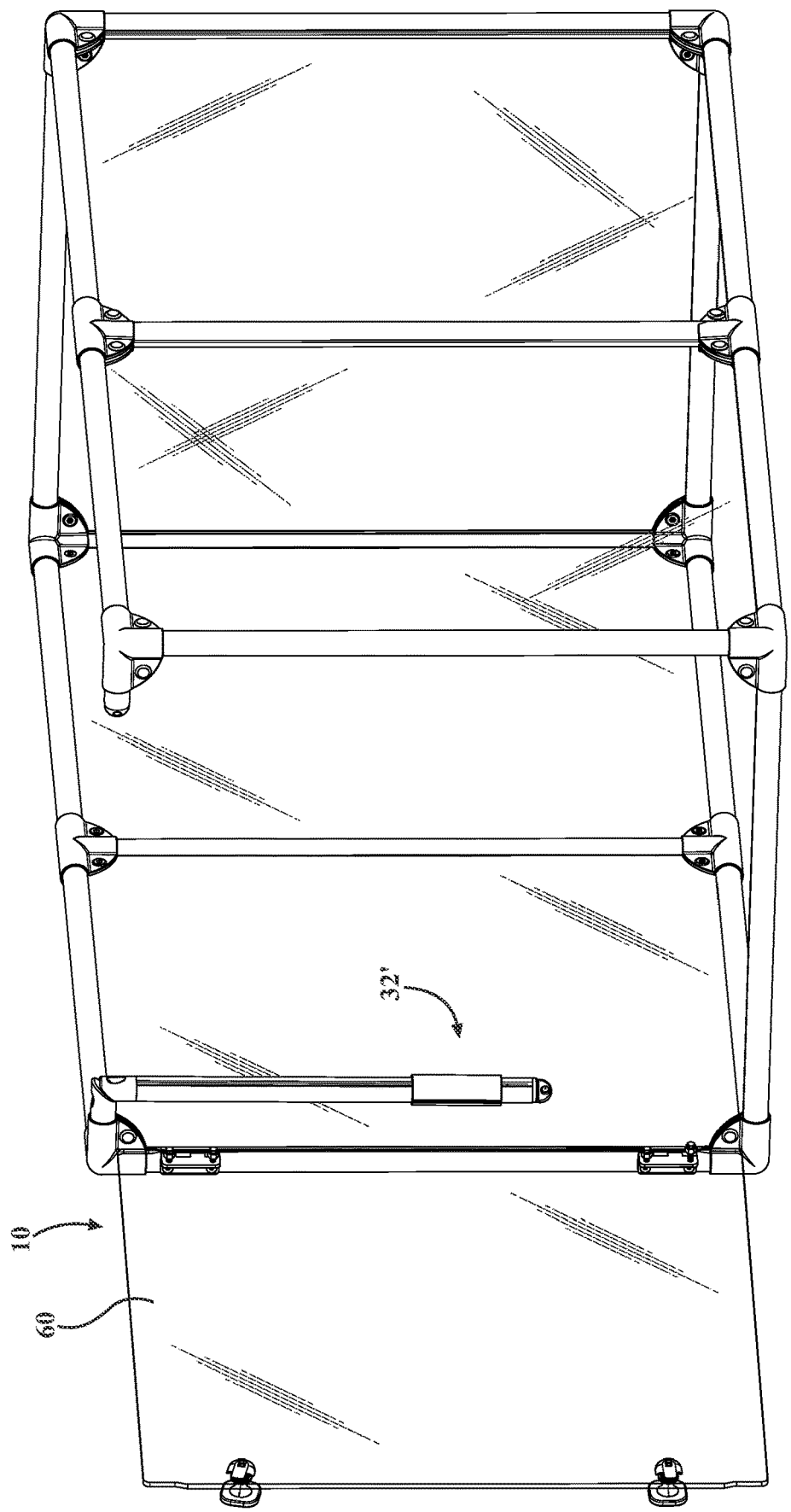
FIG. 26 is a view of the pen, showing the movable top frame member in an open position.

FIG. 25 is an exploded view of one example of the top frame member 32'. The top frame member 32' can include a frame member 32, a movable catch connector 100, a fixed catch connector 102, a movable pivot connector 104, and a fixed pivot connector 106. The movable catch connector 100 can be operatively connected to a first end 32a of the frame member 32 in any suitable manner. The movable pivot connector 104 can be operatively connected to a second end 32b of the frame member 32 in any suitable manner. The first end 32a and the second end 32b are on opposite ends of the frame member 32. The movable catch connector 100 and the movable pivot connector 104 are described as being "movable" because they move with the top frame member 32', as will be described herein. However, the movable catch connector 100 and the movable pivot connector 104 can be fixed relative to the top frame member 32' itself. Thus, the movable catch connector 100 and/or the movable pivot connector 104 do not move relative to the top frame member 32'. The fixed catch connector 102 and the fixed pivot connector 106 are described as being "fixed" because they generally are stationary and do not move with the top frame member 32'.

The fixed catch connector 102 can be operatively connected to a corner connector 44 in any suitable manner, including, for example, by adhesives, mechanical engagements, and/or one or more fasteners (e.g., fastener(s) 80), just to name a few possibilities. In one or more arrangements, the fixed catch connector 102 can include a body portion 103 and a web 105. In one or more arrangements, the body portion can be substantially the same shape as the frame member engagement portions 42 of the corner connector 44. For instance, the body portion 103 can be substantially cylindrical. The body portion 103 can be sized to be received in the frame member engagement portion 42. Alternatively, the body portion 103 can be sized such that it receives the frame member engagement portion 42. The web 105 of the fixed catch connector 102 can be received in a slot 52 of the web 50 in the corner connector. In one or more arrangements, the fasteners 80 can be used to join the web 50 of the corner connector 44 and the web 105 of the fixed catch connector 102.

Figure 24:
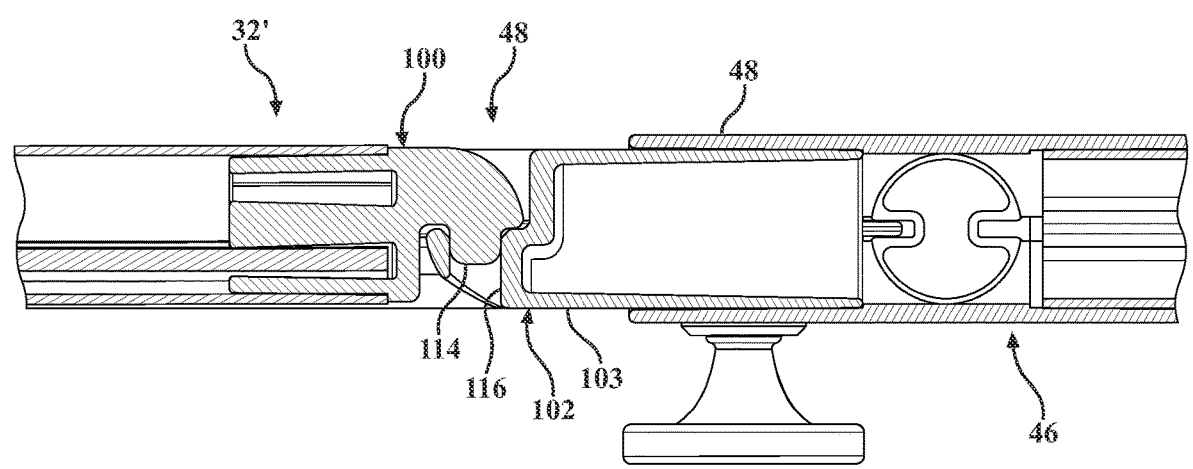
FIG. 24 is a cross-sectional top view of a portion of the pen, showing the first end of the movable top frame member in a closed, unlocked position.

The movable catch connector 100 can be removably connected to the fixed catch connector 102 at a first interface 110. Any form of connection can be provided. For instance, in one or more arrangements, the movable catch connector 100 can include a male connector 114 (e.g., a peg, protrusion, etc.), and the fixed catch connector 102 can include a corresponding female connector 116 (e.g., aperture, hole, etc.). FIG. 24 shows an example of when the movable catch connector 100 is engaged with the fixed catch connector 102. The movable catch connector 100 and the fixed catch connector 102 can be configured so that they can be selectively connected and disconnected by a person's hand. For instance, a person can snap the male connector 114 on the movable catch connector 100 into the female connector 116 of the fixed catch connector 102. Of course, it will be appreciated that there can be arrangements in which the movable catch connector 100 includes a female connector and the fixed catch connector 102 includes a male connector. Also, it will be appreciated that forms of connection, other than male-female connectors, can be used between the movable catch connector 100 and the fixed catch connector 102.

The fixed pivot connector 106 can be operatively connected to a corner connector 44 in any suitable manner, including, for example, by adhesives, mechanical engagements, and/or one or more fasteners (e.g., fastener(s) 80), just to name a few possibilities. In one or more arrangements, the fixed pivot connector 106 can include a body portion 107 and a web 109. The above discussion of the body portion 103 and the web 105 of the fixed catch connector 102 and their interaction with a corner connector 44 applied equally to the body portion 107 and the web 109 of the fixed pivot connector 106.

The movable pivot connector 104 can be pivotably attached and/or hingedly attached to the fixed pivot connector 106 at a second interface 112. Such pivotable and/or hinged attachment can be achieved in any suitable manner. For instance, the movable pivot connector 104 can be pivotably attached and/or hingedly attached to the fixed pivot connector 106 by one or more pivot/hinge elements 117, 117' (see FIGS. 21-22). The movable pivot connector 104 can be configured to rotate about an axis 118 of the fixed pivot connector 106. In one or more arrangements, a face 119 of the fixed pivot connector 106 can be angled such that the axis 118 is, relative to horizontal, from about 80 degrees or less, 70 degrees or less, 60 degrees or less, 50 degrees or less, 45 degrees or less 40 degrees or less, 30 degrees or less, 20 degrees or less, or about 10 degrees or less. When assembled as part of the pen 10, the face 119 of the fixed pivot connector 106 can face in a generally downward direction. Likewise, the movable pivot connector 104 can have a corresponding face 120 to facilitate such rotation. The movable pivot connector 104 can be rotatable about the axis 118 in a clockwise and/or a counterclockwise direction. In one or more arrangements, the axis 118 can be defined at least in part by one or more pivot/hinge elements 117, 117'.

The movable pivot connector 104 and the fixed pivot connector 106 can be configured so that they are not readily separated from each other. Indeed, as is shown in FIG. 26, the movable pivot connector 104 and the fixed pivot connector 106 remain attached when the top frame member 32' is in the open position.

In some arrangements, the top frame member 32' can be configured to conceal at least some of the features that enable movement of the top frame member 32' between the closed position and the open position. Such arrangements can help to prevent inadvertent movement of the top frame member 32'. Such arrangements can help to maintaining a clean, modern appearance of the pen 10.

Figure 18:
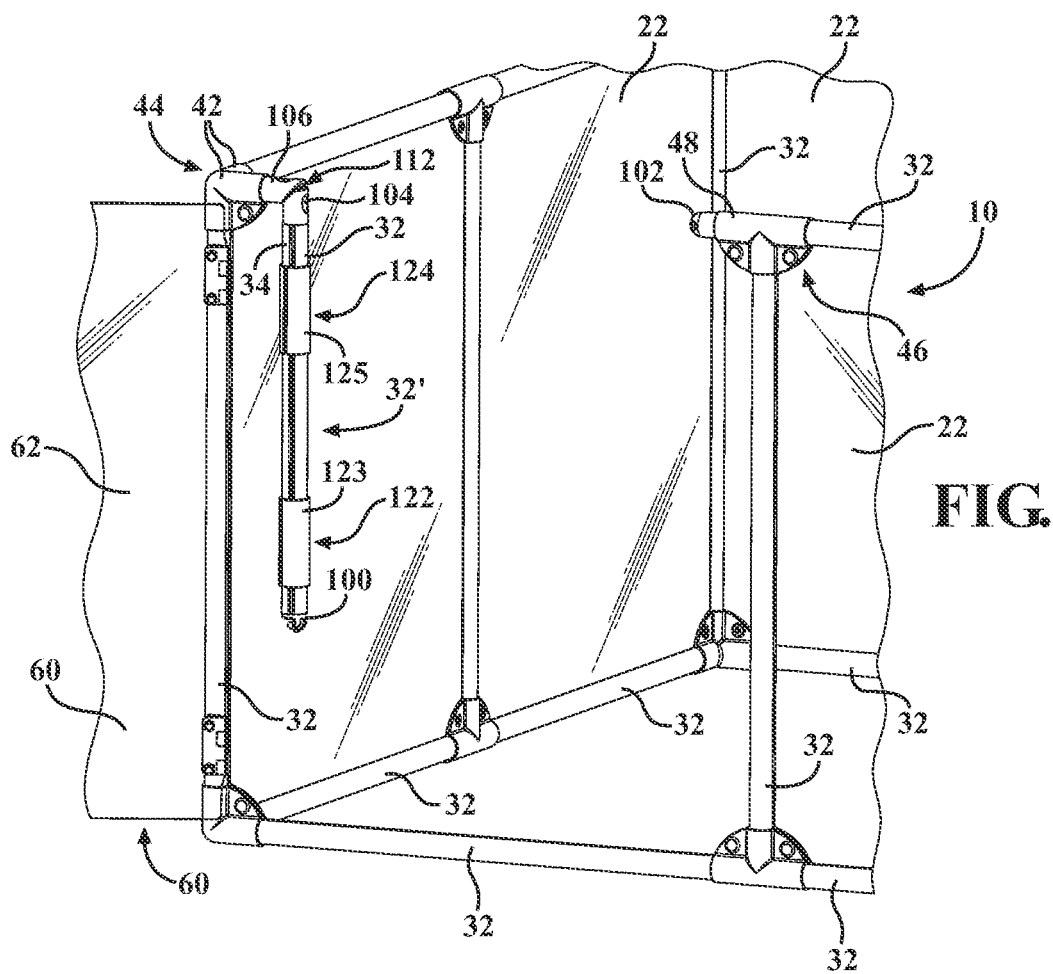
FIG. 18 is a view of a portion of the pen, showing the movable top frame member in an open position.

In one or more arrangements, the top frame member 32' can include a first locking sleeve 122 and a second locking sleeve 124. The first locking sleeve 122 and the second locking sleeve 124 can be selectively movable along the frame member 32 between a locked position (FIGS. 12-13) and an unlocked position (FIG. 14). In the locked position, the first interface 110 can be hidden behind the first locking sleeve 122, and the second interface 112 can be hidden behind the second locking sleeve 124. In addition, the first locking sleeve 122 and second locking sleeve 124 can prevent the top frame member 32' from inadvertently being moved. Indeed, there may be times in which a user merely wishes to open the door 60 of the pen 10 to allow an animal to enter or exit. In one or more arrangements, the first locking sleeve 122 can have substantially cylindrical, hollow body with a longitudinal slit 123 (FIG. 18), and/or the second locking sleeve 124 can have substantially cylindrical, hollow body with a longitudinal slit 125 (FIG. 18). The first locking sleeve 122 and/or the second locking sleeve 124 can be configured to clamp onto the frame member 32 snugly.

Figure 12:
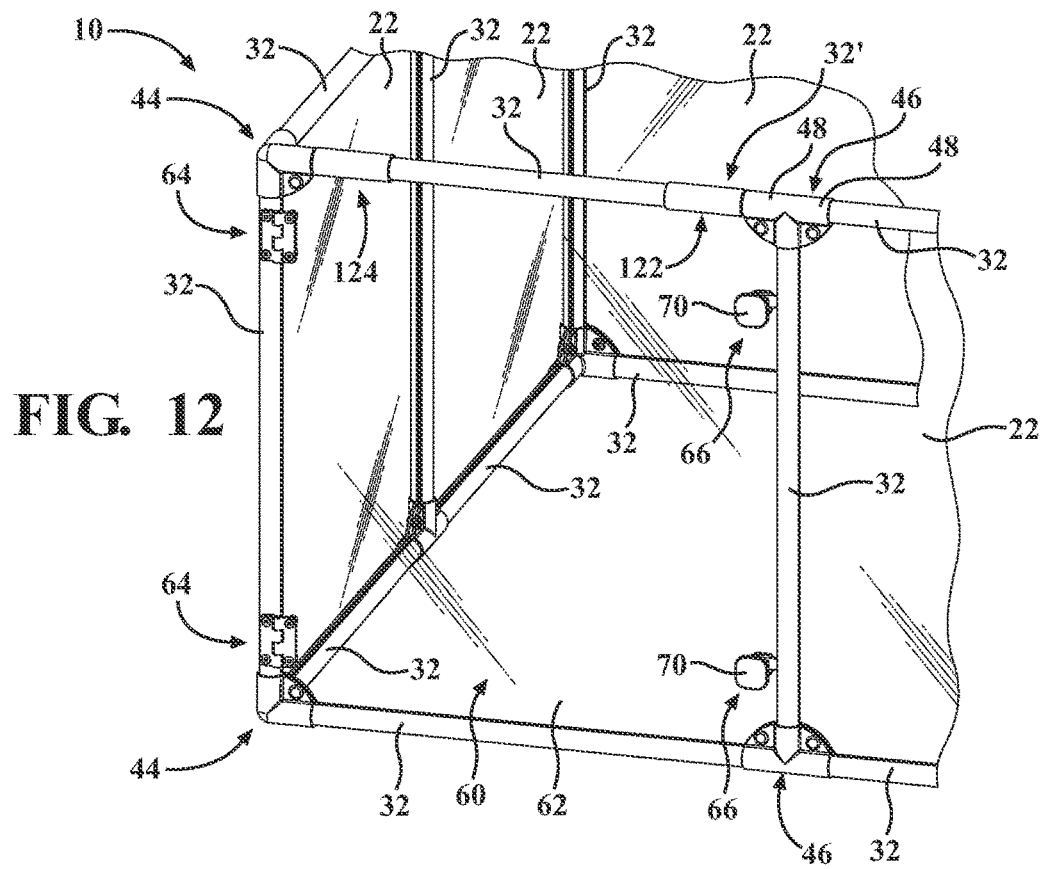
FIG. 12 is a view of a portion of the pen with a movable top frame member, showing the door in a closed position and the top frame member in a closed, locked position.
Figure 13:
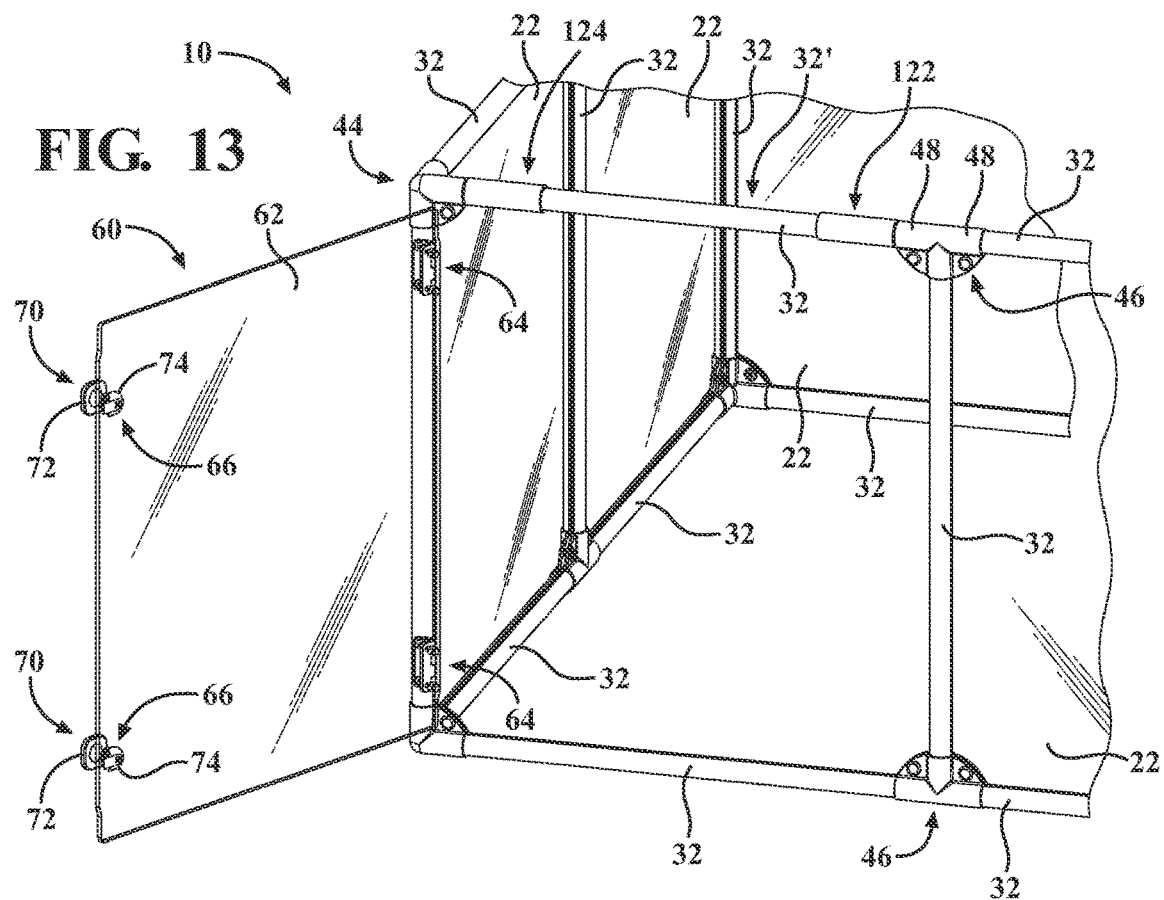
FIG. 13 is a view of a portion of the pen with a movable top frame member, showing the door in an open position and the top frame member in a closed, locked position.
Figure 21:
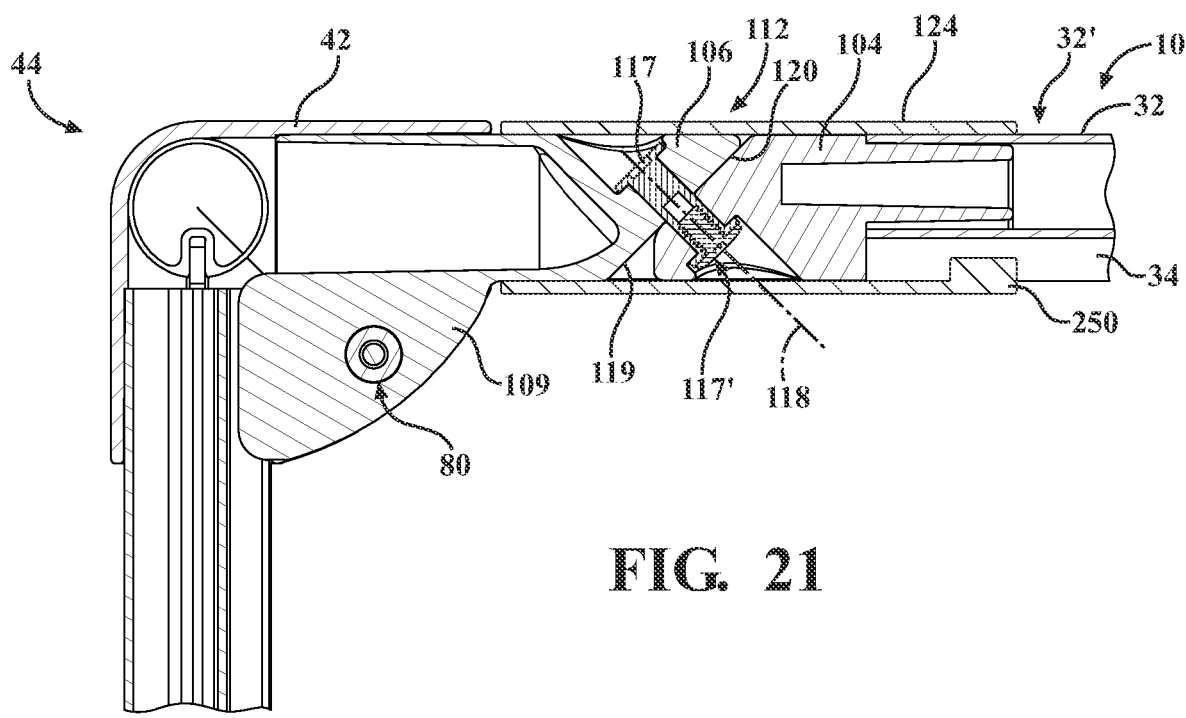
FIG. 21 is a cross-sectional view of the interface at the second end of the movable top frame member when the movable top frame member is in the closed, locked position.

An example of the opening of the door 60 and top frame member 32' will now be described. In FIG. 12, the door 60 of the pen 10 is shown as being in a closed position, and the top frame member 32' is shown as being in a closed position. In FIG. 13, the door 60 of the pen 10 is shown as being in an open position, which can be performed as described above. In addition, the top frame member 32' is shown as being in a closed position. In both of these figures, the top frame member 32' is also in a locked position. As can be seen, the first locking sleeve 122 can cover the first interface 110, and the second locking sleeve 124 can cover the second interface 112. FIG. 21 shows a side elevation cross-sectional view of the pen 10 at the second interface 112. As can be seen, the second locking sleeve 124 covers the second interface 112.

FIG. 14 shows an example in which the top frame member 32' is in a closed position as well as in an unlocked position. As can be seen, both the first locking sleeve 122 and the second locking sleeve 124 have been moved toward each other along the frame member 32. As a result, the first interface 110 is exposed, and the second interface 112 is exposed. FIG. 24 is a cross-sectional top view of the first interface 110 of the pen 10 in such a condition. It can be seen that the top frame member 32' is in the closed position with the movable catch connector 100 engaged with the fixed catch connector 102.

Figure 23:
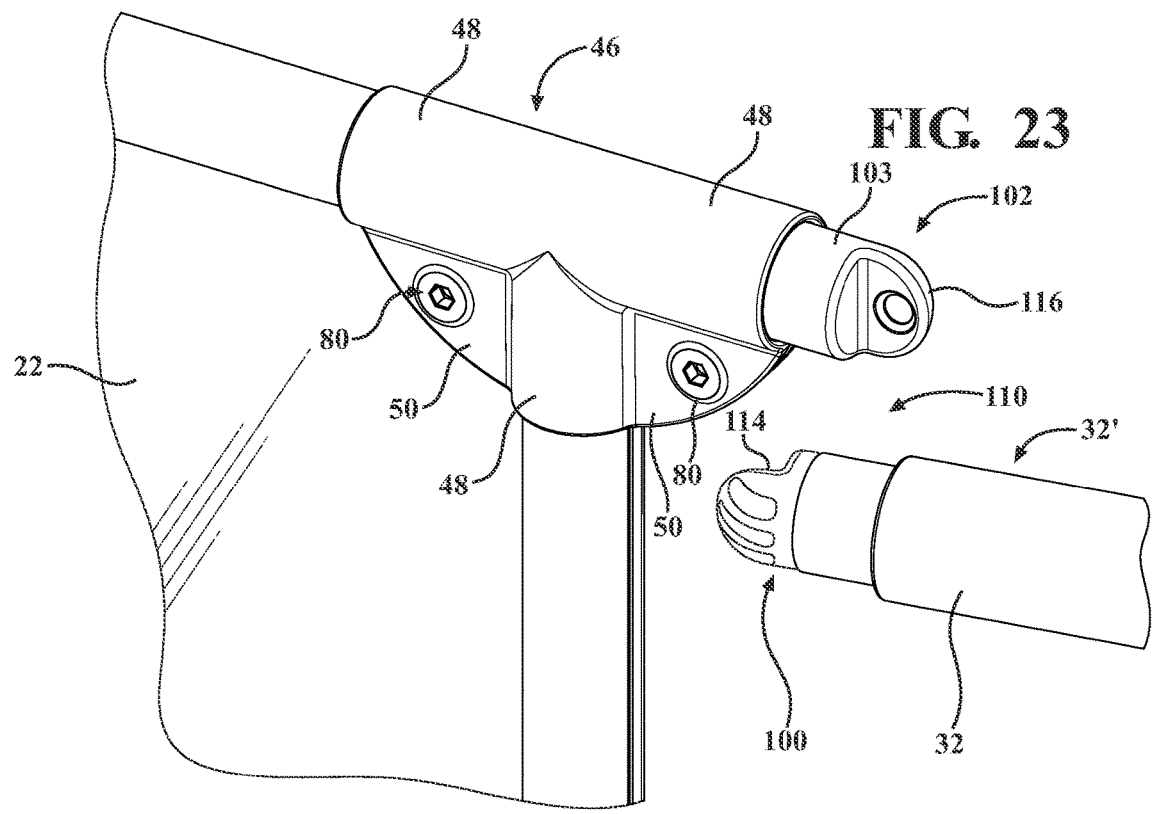
FIG. 23 is a close-up view of a portion of the pen, showing the interface at the first end of the movable top frame member when the first end is disengaged.

FIG. 15 shows the movable catch connector 100 disengaged from the fixed catch connector 102. Such disengagement can be performed by hand (e.g. a user pushes on the top frame member 32' near the first interface 110 in a direction toward the interior of the pen 10). FIG. 23 is a close-up view of the first interface 110 when the movable catch connector 100 is disengaged from the fixed catch connector 102.

Figure 16:
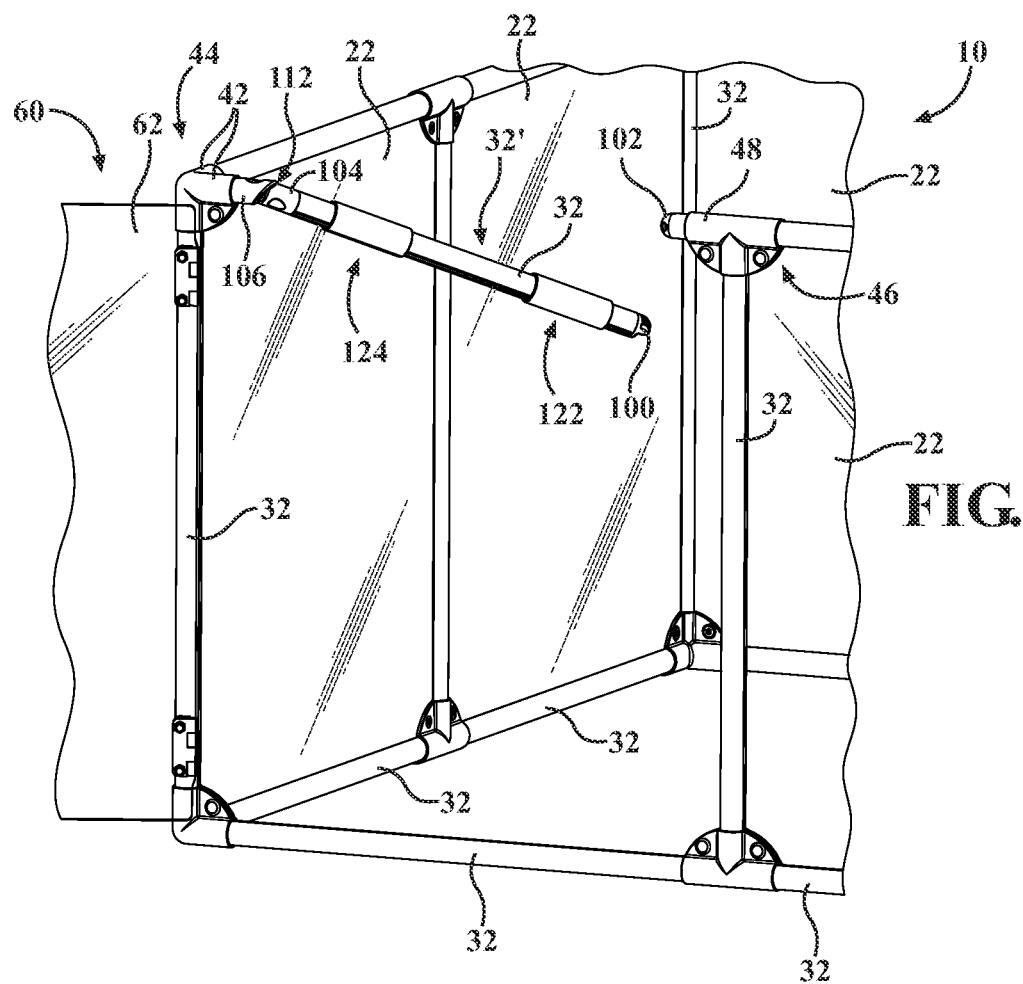
FIG. 16 is a view of a portion of the pen with a movable top frame member, showing the movable top frame member being moved out of the way.
Figure 17:
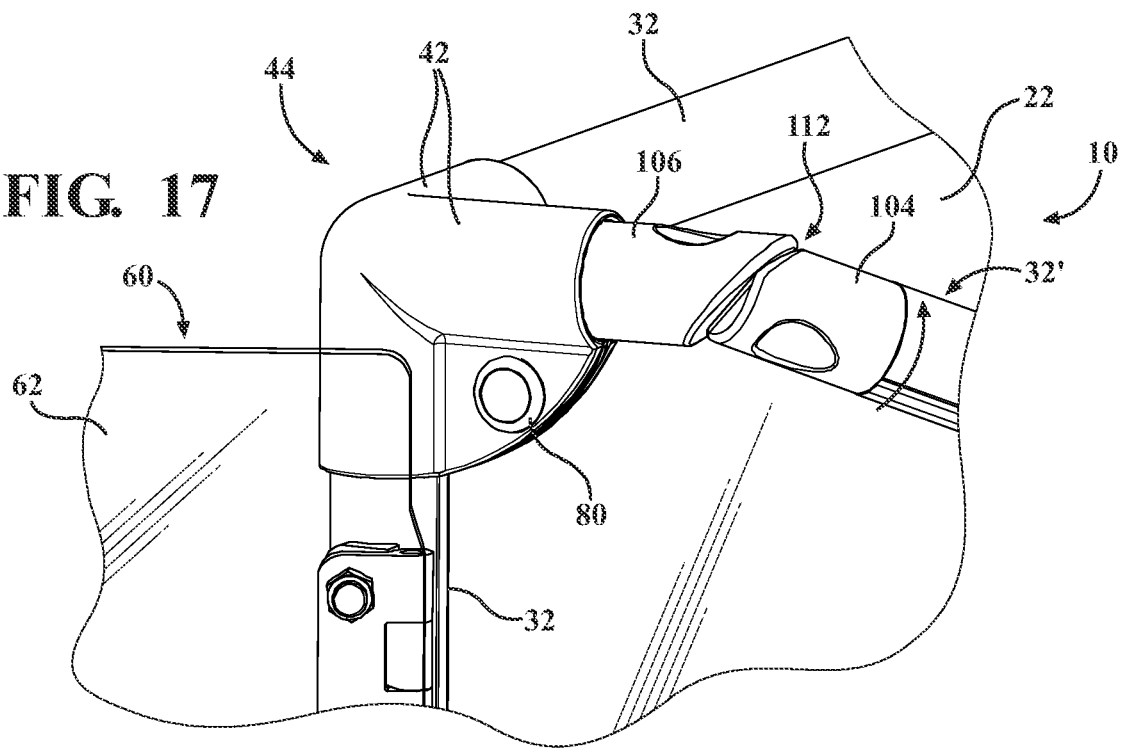
FIG. 17 is a close-up view of a portion of the pen, showing an interface at a second end of the movable top frame member.

FIG. 16 shows the top frame member 32' pivoting about the fixed pivot connector 106. As it does so, the top frame member 32' is rotating clockwise, generally downwardly and into the pen 10. FIG. 17 is a close-up view of the second interface 112 at the moment shown in FIG. 16. As can be seen, the position of the fixed pivot connector 106 has not changed, but the movable pivot connector 104 has rotated clockwise.

Figure 19:
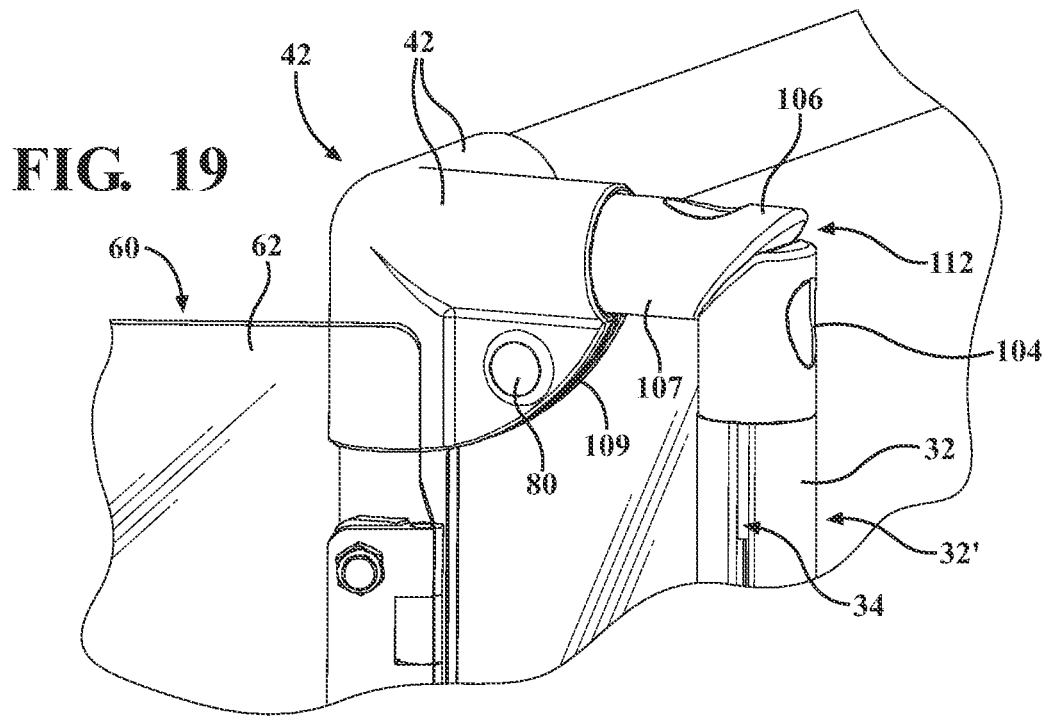
FIG. 19 is a close-up view of a portion of the pen, showing the interface at the second end of the movable top frame member.
Figure 22:
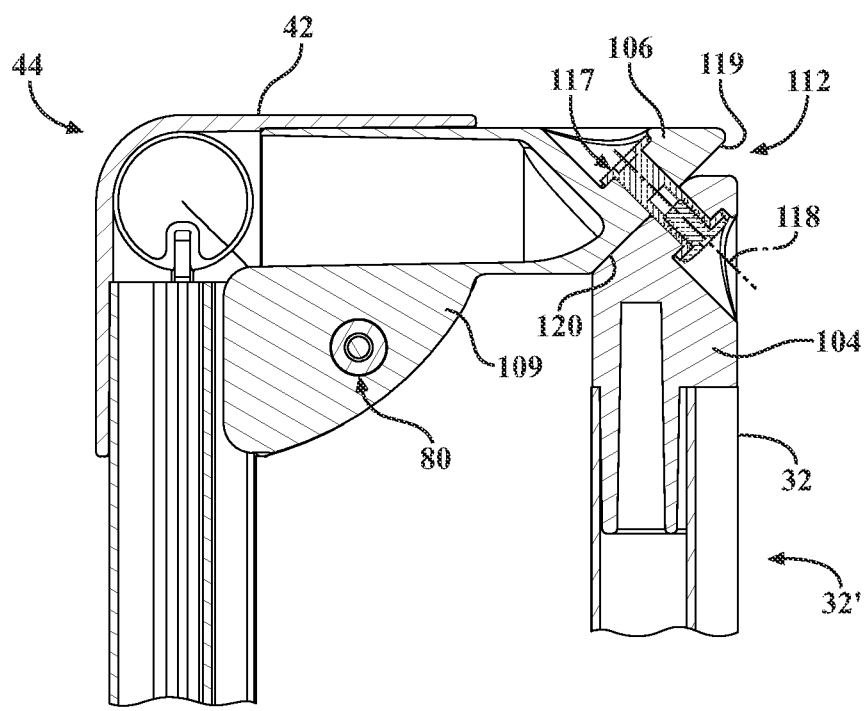
FIG. 22 is a cross-sectional view of the interface at the second end of the movable top frame member when the movable top frame member is in the open position.

FIG. 18 is a view of a portion of the pen, showing the top frame member 32' in an open position. As can be seen, the top frame member 32' extends downwardly. In this position, the top frame member 32' can be substantially vertical. The top frame member 32' can be substantially parallel to the vertical frame members of the pen 10. FIG. 19 is a close-up view of the second interface 112 at the moment shown in FIG. 18. The position of the fixed pivot connector 106 has not changed, but the movable pivot connector 104 has further rotated clockwise. In this configuration, the movable pivot connector 104 has pivoted about 180 degrees about the axis 118. FIG. 22 is a cross-sectional view of the interface at the second end of the movable top frame member when the movable top frame member is in the open position.

With the door 60 in the open position and the top frame member 32' in the open position, a person can easily enter and exit the space 12 enclosed within the pen 10. It should be noted that the top frame member 32' can be moved back into the closed position by performing the above-described actions in reverse order.

The movement of the first locking sleeve 122 and/or the second locking sleeve 124 can be limited. For instance, when the top frame member 32' is in the open position, movement of the first locking sleeve 122 and/or the second locking sleeve 124 can be limited to prevent them from sliding off of the end of the top frame member 32'. The limiting of the movement of the first locking sleeve 122 and/or the second locking sleeve 124 can be achieved in any suitable manner. As an example, the first locking sleeve 122 and/or the second locking sleeve 124 can include an internal tab 250 (FIG. 21). The internal tab 250 can be received in the slot 34 of the frame member 32.

In some instances, when the door 60 is in the open position, the weight of the door 60 may pull on the wall 20 that it forms a part of, potentially distorting the structure of the walls of the pen 10. The door 60 may sag to a point where it touches the floor. As a result, smooth operation of the door 60 can be adversely affected. The pen 10 can be configured to minimize the likelihood of such an occurrence. For instance, the pen 10 can include one or more reinforcing members. The reinforcing members can have any suitable configuration. The reinforcing member can be provided in any suitable location.

Figure 20:
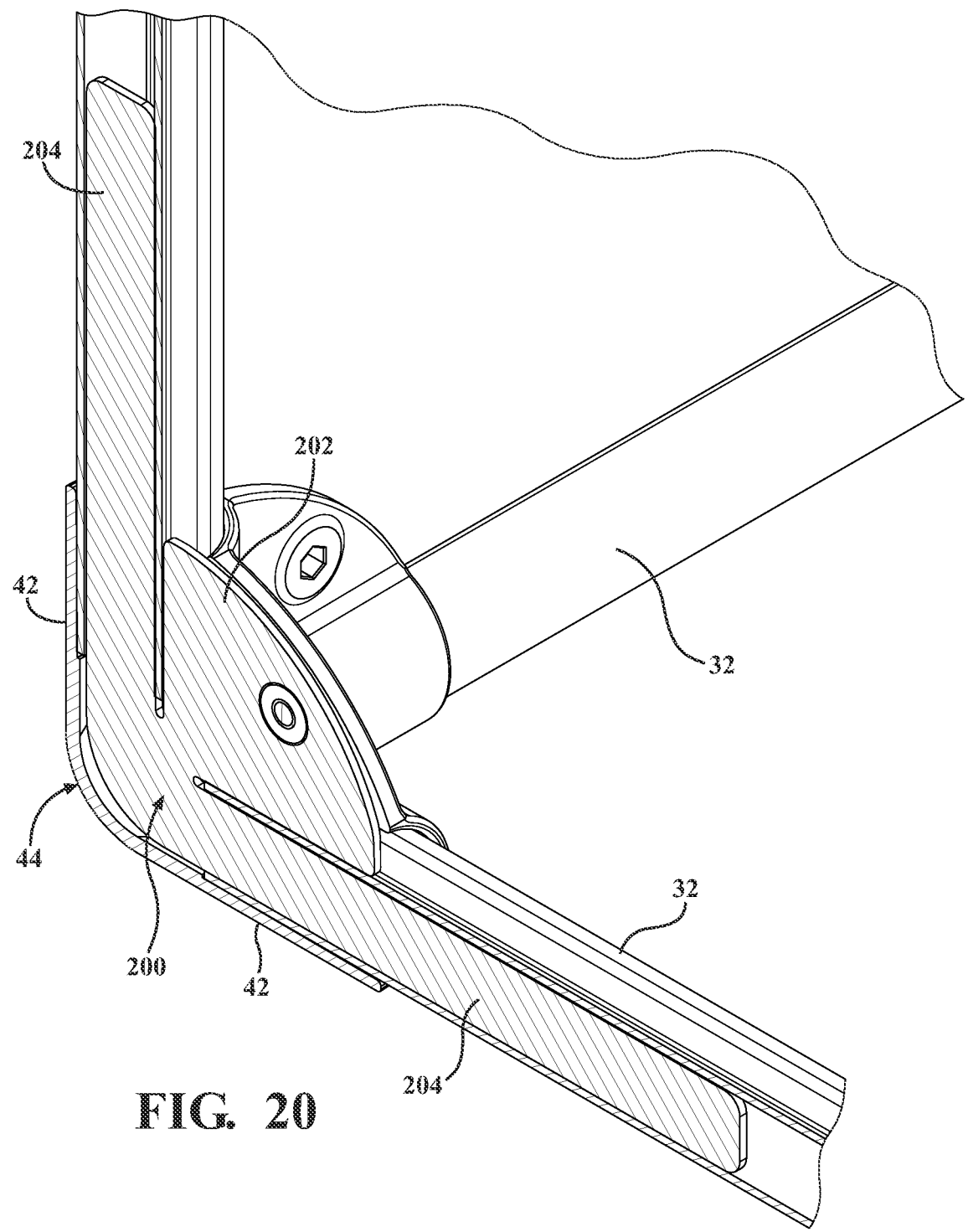
FIG. 20 is a cross-sectional view of a lower portion of the wall of the pen that includes the door, showing a reinforcing member.

FIG. 20 is a cross-sectional view of a lower portion of the wall 20 of the pen 10 that includes the door 60. One example of a reinforcing member 200 is shown. In one or more arrangements, the reinforcing member 200 can be a gusset. The reinforcing member 200 can be made of any suitable material. As an example, the reinforcing member can be made of steel or other suitable metal.

In one or more arrangements, the reinforcing member 200 can include a central portion 202 that is located within the corner connector 44. The reinforcing member 200 can have one or more arms 204. The arm(s) 204 can extend into a respective the frame member 32 that meets at the corner connector 44. The reinforcing member 200 can keep help to keep these frame members 32 rigid and to maintain their substantially 90 degree relationship to each other. With the reinforcing member 200 being located inside of the frame members 32 and the corner connector 44, it would not be visible from the exterior of the pen 10. Thus, a clean, modern appearance of the pen 10 can be maintained. However, it will be appreciated that, in some instances, one or more reinforcing members can be provided at least partially on the exterior of the frame members 32 and/or the corner connector 44.

The pen 10 described and shown herein can be provided as a kit. In one implementation, the kit can include a plurality of the wall panels 22. In one or more arrangements, the wall panels 22 can be substantially identical to each other. In one or more arrangements, the kit can include one or more doors 60. In some instances, the door(s) 60 can be pre-assembled with mounting hardware (e.g., one or more hinges 64, one or more latches 66, etc.). Alternatively, in one or more instances, the mounting hardware may not be pre-assembled on the door(s) 60. The kit can include the hardware for the frame 30 (e.g., the plurality of frame members 32, the connectors 40, etc.). In one or more arrangements, the plurality of frame members 32 can be substantially identical to each other. Alternatively, one or more of the frame members 32 can be different from the other frame members in one or more respects. In one or more arrangements, the plurality of frame members 32 can be all the same color. In one or more arrangements, there can be a plurality of frame members 32 of a first color, and a plurality of frame members of a second color. The first color can be different from the second color.

In some arrangements, one or more accessory kits can be provided for the pen 10.

One example of an accessory kit can be a bump out kit. The bump out kit can enable a user to add an expansion area perpendicular to one side of an existing pen 10. This area can have any suitable size. In one or more arrangements, this area can be about 2 feet by about 2 feet. In one or more arrangements, this area can be about 1 foot by about 1 foot. The bump out area can be used to provide a greater area for an animal in the pen 10. In some instances, the bump out area may be useful as an area to place a bed or to place food dishes, away from a main space of the pen 10.

Figure 27:
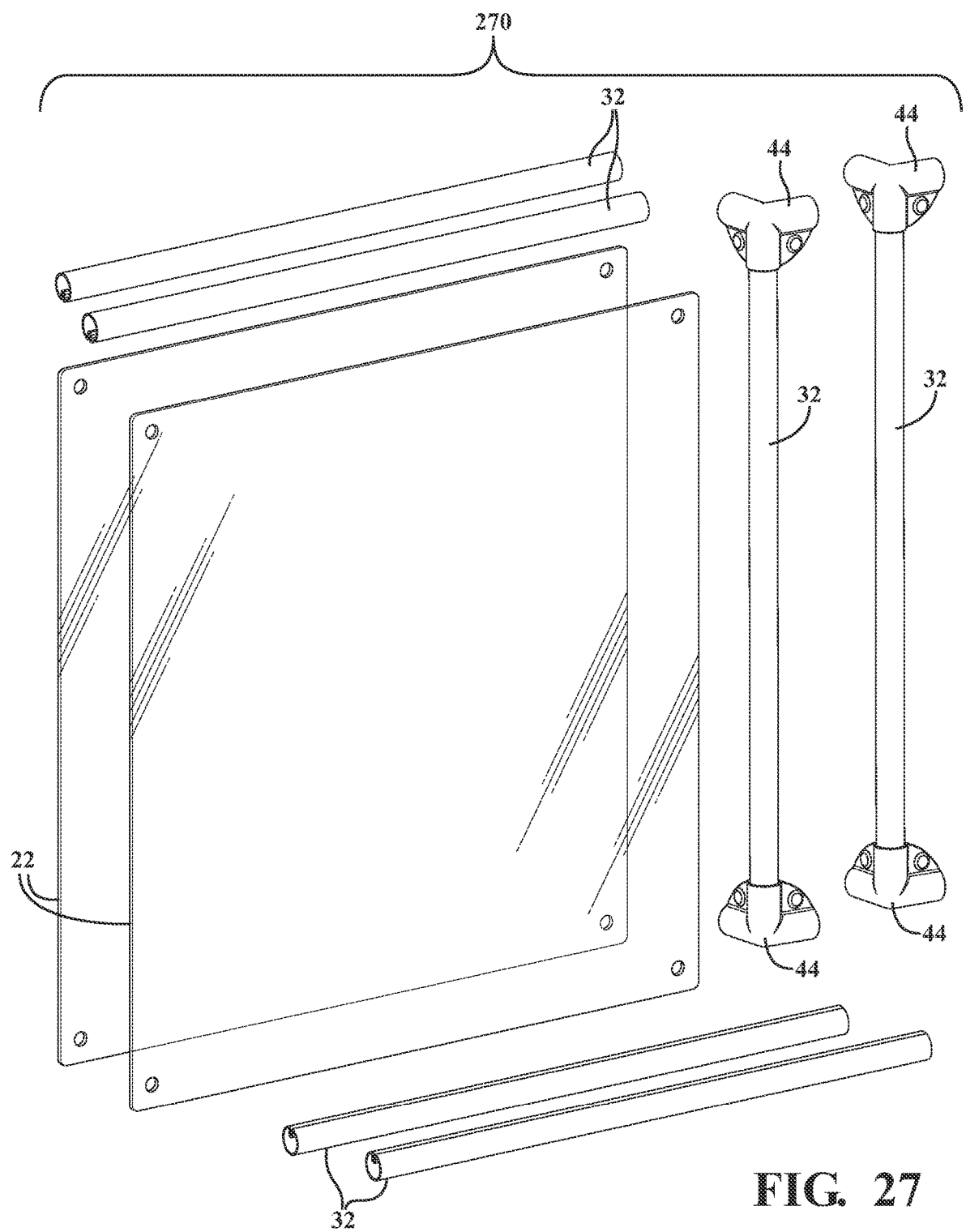
FIG. 27 is an example of a bump out kit.

Referring to FIG. 27, an example of the bump out kit 270 is shown. The bump out kit 270 can include a plurality of wall panels 22. The bump out kit 270 can include a plurality of frame members 32 (e.g., a plurality of frame members that are substantially horizontal when installed and a plurality of frame members that are substantially vertical when installed). The bump out kit 270 can include a plurality of corner connectors 44. The bump out kit 270 can include a plurality of fasteners (e.g., fasteners 80) for connecting the wall panels 22 to the corner connectors 44.

Figure 28:
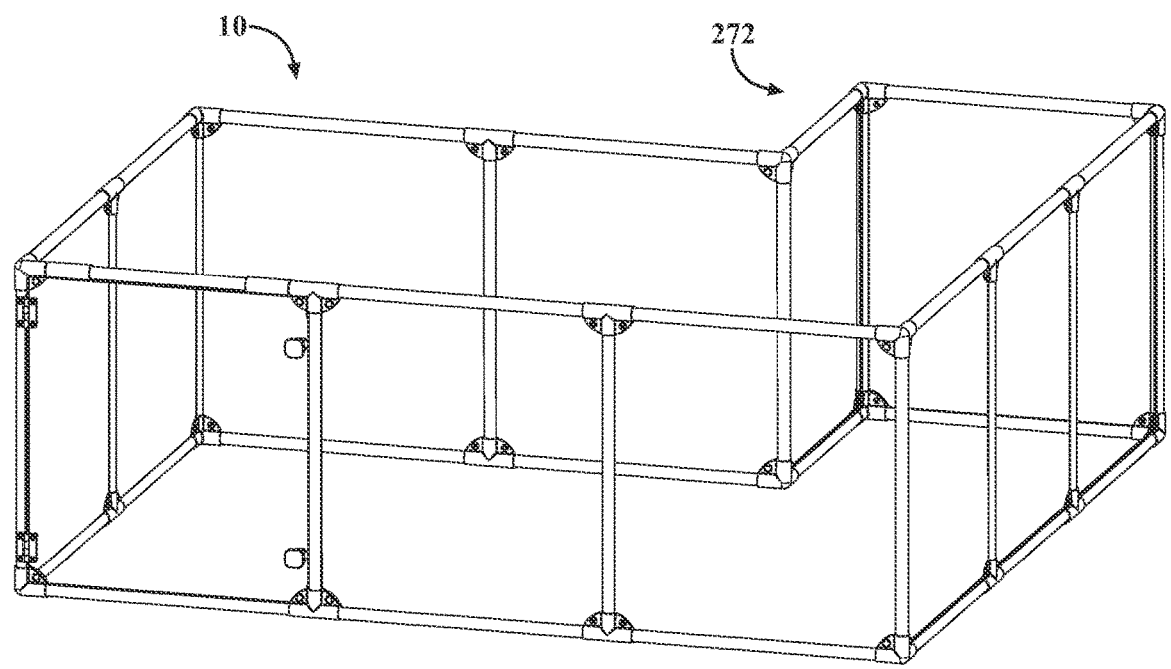
FIG. 28 is an example of a pen, showing a bump out configuration.
Figure 29:
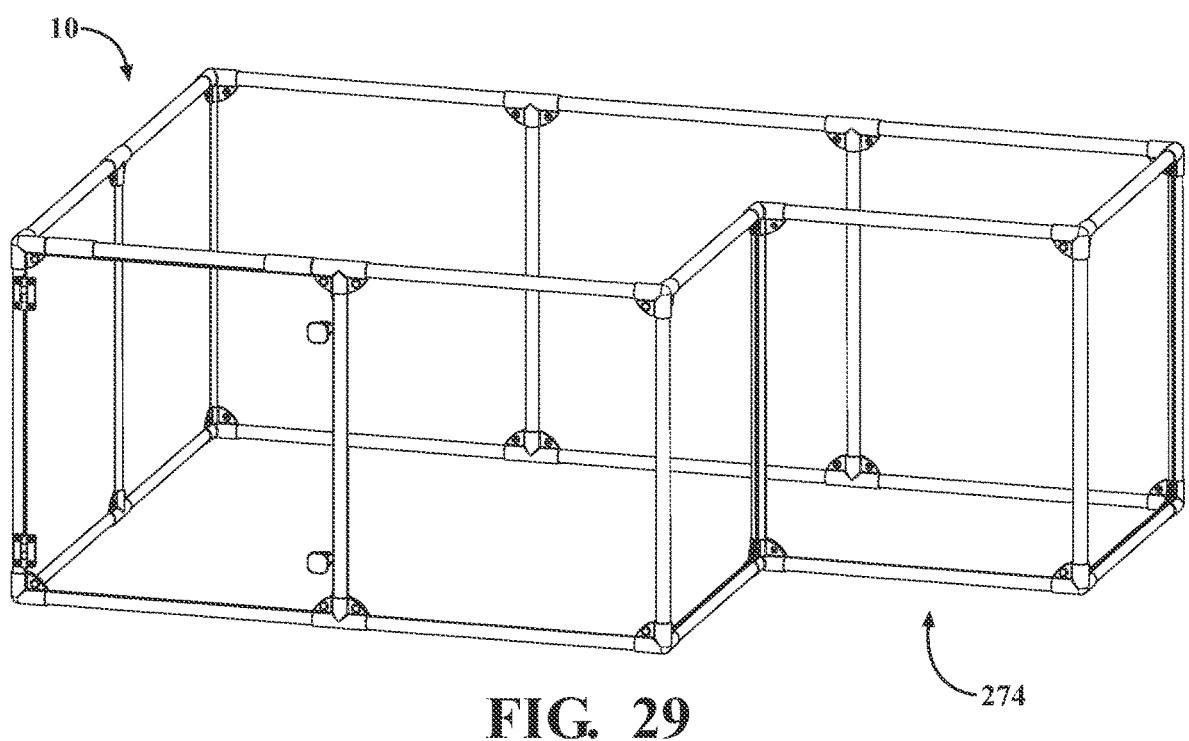
FIG. 29 is an example of a pen, showing a bump out configuration.
Figure 30A:
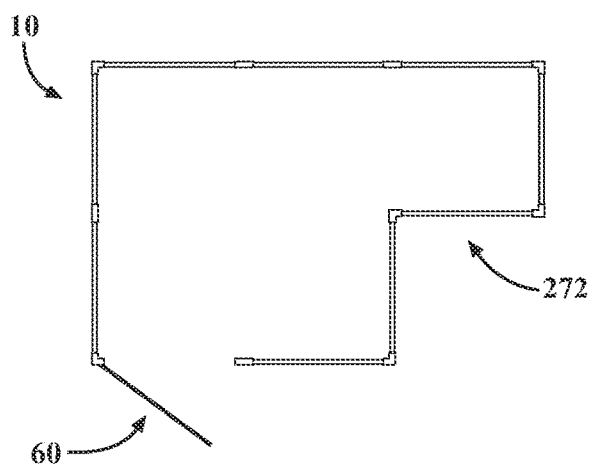
FIGS. 30A-E show examples of a pen with various bump out configurations.
Figure 30B:
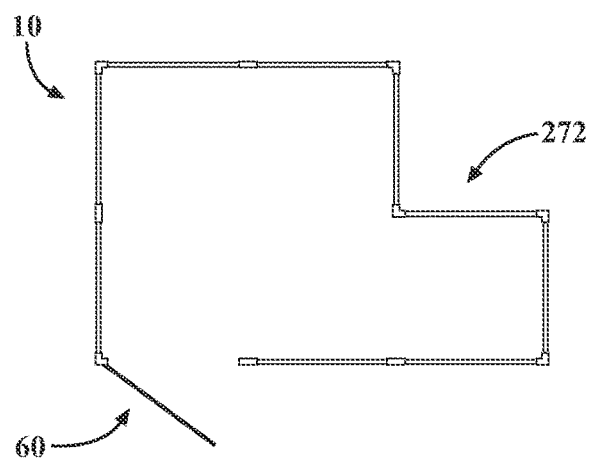
Figure 30C:
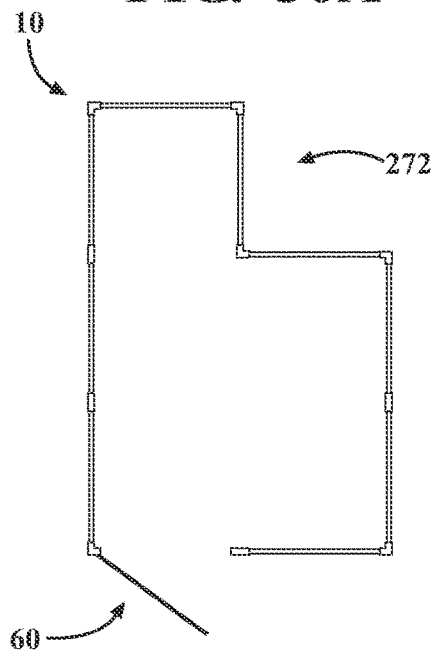
Figure 30D:
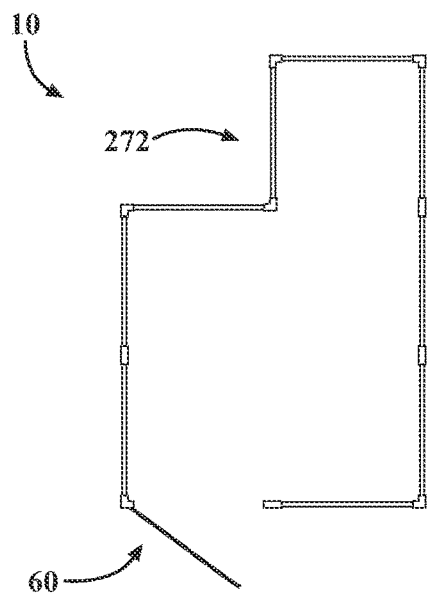
Figure 30E:
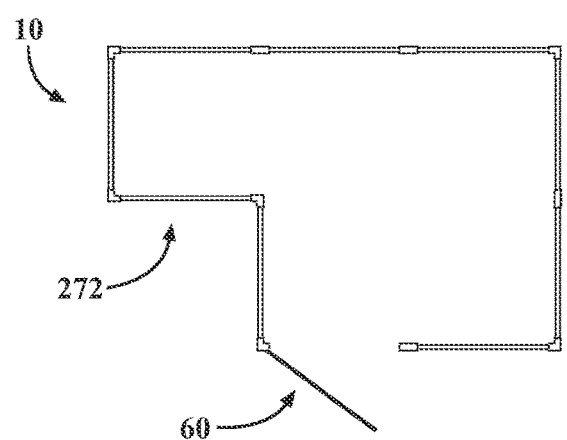

The bump out kit 270 can be used to provide a bump out area on various existing pens 10. FIG. 28 shows an example of a 4 foot×6 foot pen in which a 2 foot×2 foot bump out area 272 has been added to the pen 10. FIG. 29 shows an example of a 4 foot×4 foot pen in which a 2×2 bump out area 272 has been added to the pen 10.

In some arrangements, this bump out area can extend from the pen 10 at a corner 11. In some arrangements, the bump out area can be extend from the pen 10 at a non-corner region. The bump out area can extend from the pen 10 in a location that it is not adjacent to the door 60. FIGS. 30A-E show various other configurations when the bump out area 272 is added to a pen 10 that is 4 foot×4 foot.

In some instances, the various components of the bump out kit 270 can be provided fully preassembled or partially preassembled. Alternatively, the various components of the bump out kit 270 can be provided disassembled.

Figure 31:
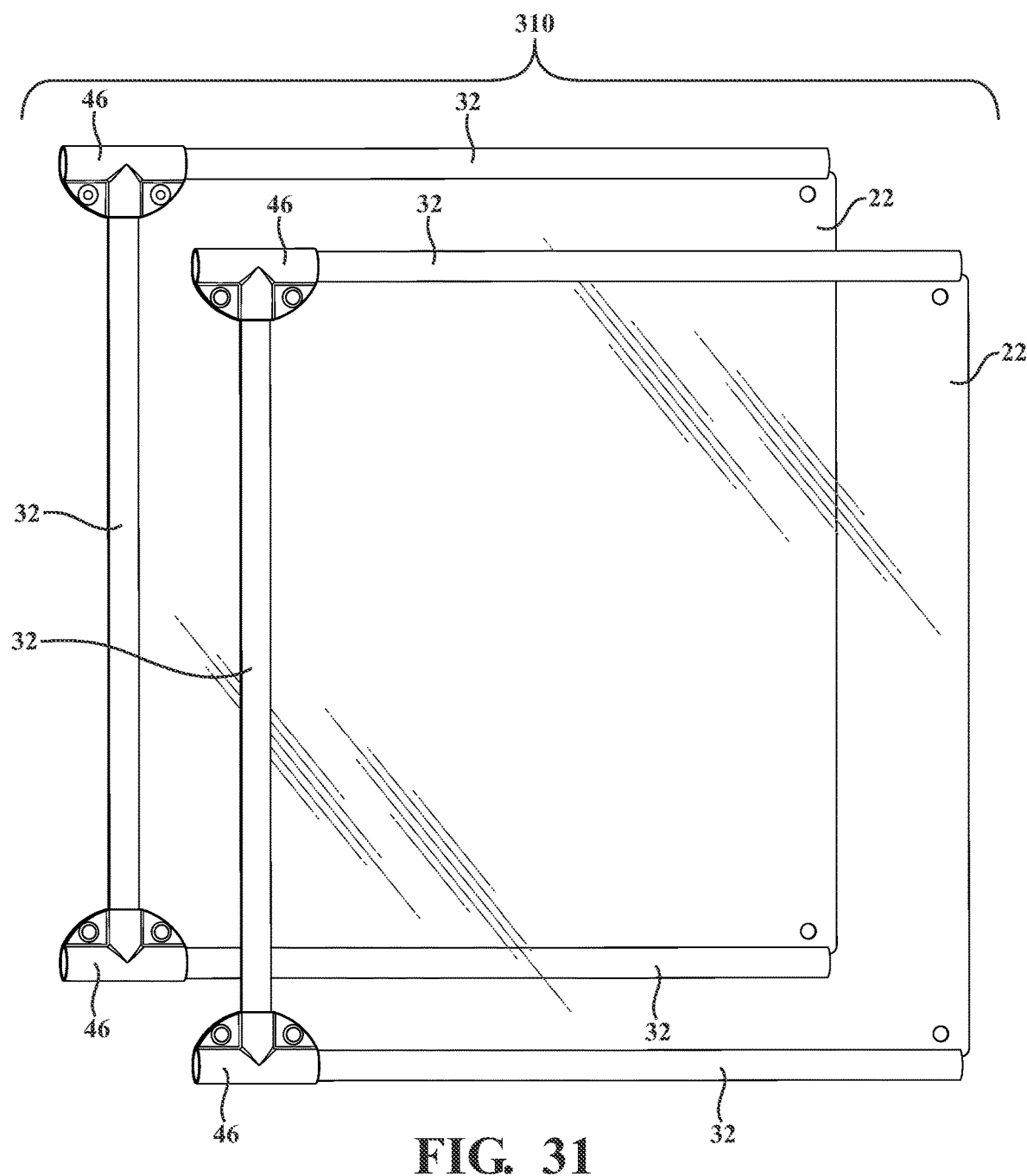
FIG. 31 is an example of an expansion kit.

Another example of an accessory kit can be an expansion kit. The expansion kit can enable a user to expand the length of a wall of an existing pen 10. Referring to FIG. 31, an example of an expansion kit 310 is shown. The expansion kit 310 can include a plurality of wall panels 22. The expansion kit 310 can include a plurality of frame members 32 (e.g., a plurality of frame members that are substantially horizontal when installed and a plurality of frame members that are substantially vertical when installed). The expansion kit 310 can include a plurality of straight connectors 46. The expansion kit 310 can include a plurality of fasteners (e.g., fasteners 80) for connecting the wall panels 22 to the straight connectors 46.

The expansion kit 310 can be used in various ways. As an example, the expansion kit 310 can be used to expand a 2 foot×4 foot pen into either a 4 foot×4 foot pen or a 2 foot×6 foot pen. As another example, the expansion kit 310 can be used to expand a 4 foot by 4 foot pen into a 4 foot×6 foot pen. As still another example, the expansion kit 310 can be used to expand a 4 foot×6 foot pen into either a 4 foot×8 foot pen or a 6 foot by 6 foot pen.

Figure 32:
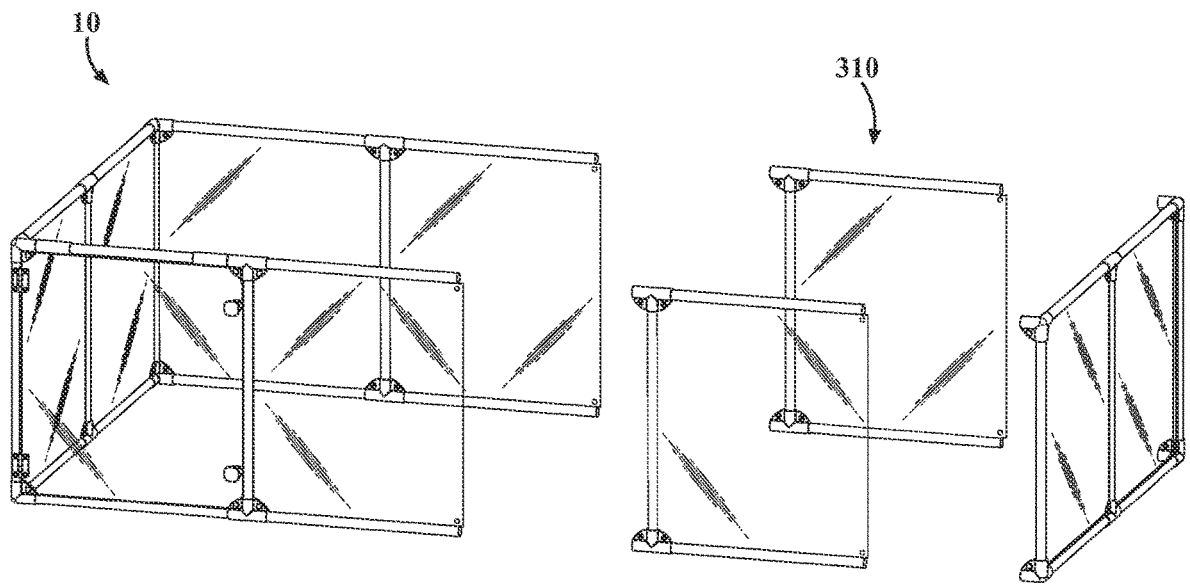
FIG. 32 is an exploded view of the pen, showing the inclusion of the expansion kit.
Figure 33:
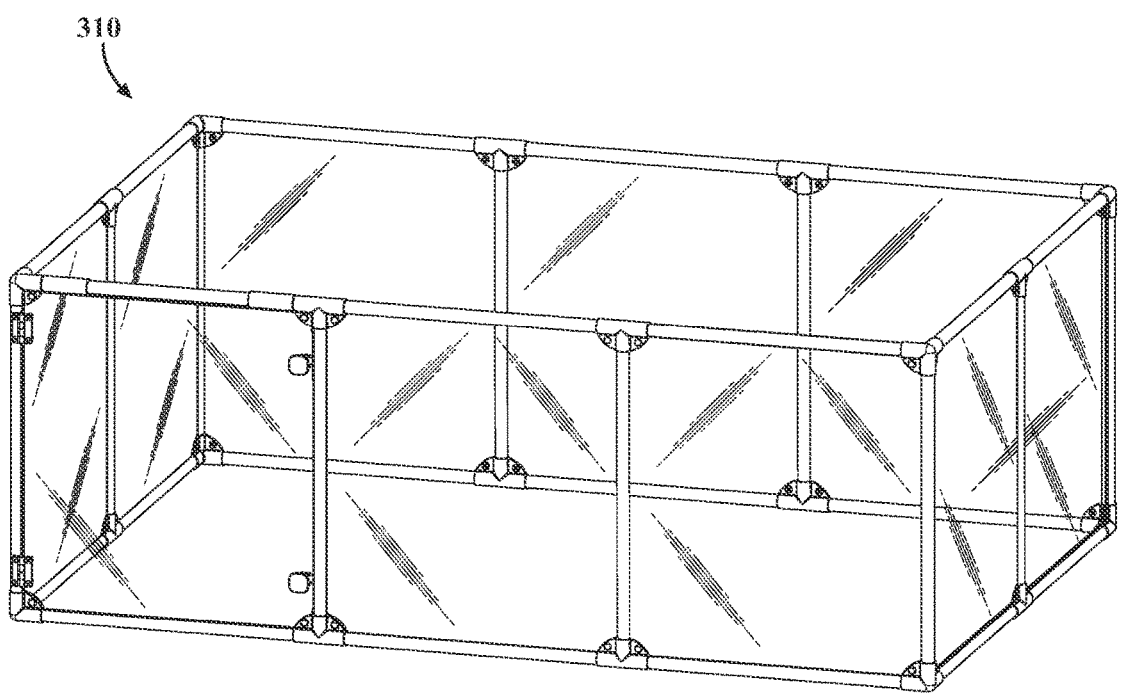
FIG. 33 is an example of a pen with an installed expansion kit.

FIG. 32 shows an exploded view of an example of a 4 foot×4 foot pen in which the expansion kit 310 is being added. FIG. 33 shows the pen, as fully assembled with the expansion kit 310. The pen 10 is now a 4 foot×6 foot pen.

In some instances, the various components of the expansion kit 310 can be provided fully preassembled or partially preassembled. Alternatively, the various components of the expansion kit 310 can be provided disassembled.

Figure 34:
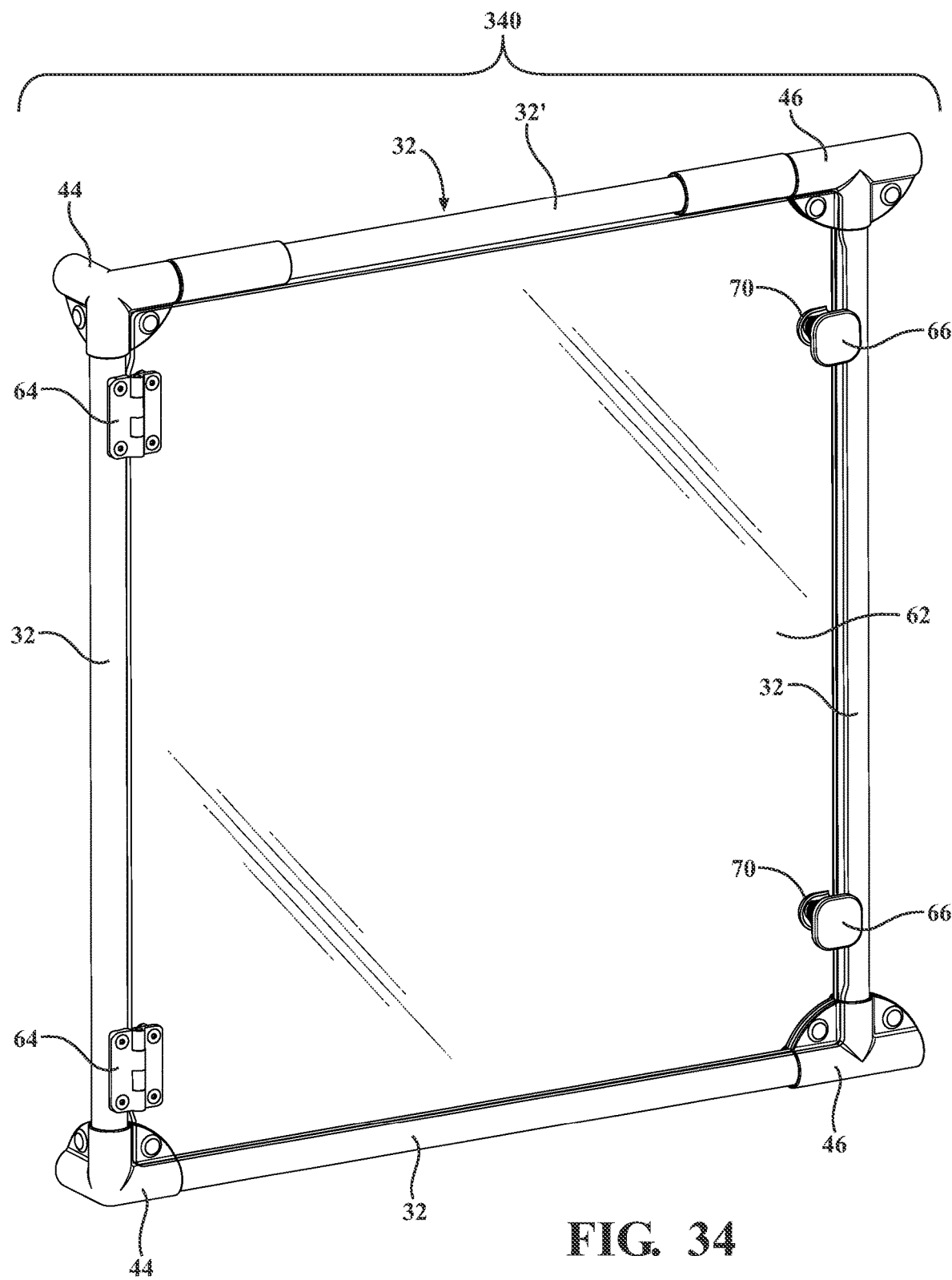
FIG. 34 is an example of a door kit.

Still another example of an accessory kit can be a door kit. The door kit can enable a user to add an access opening or a second access opening to the pen 10. Referring to FIG. 34, an example of a door kit 340 is shown. The door kit 340 can include one or more door panels 62. The door kit 340 can include one or more hinges 64, one or more latches 66, and/or one or more user interface elements 70. The door kit 340 can include a plurality of frame members 32 (e.g., a plurality of frame members that are substantially horizontal when installed on the pen 10 and a plurality of frame members that are substantially vertical when installed on the pen 10). In some instances, one of the frame members 32 can be a top frame member 32'. The bump out kit 270 can include a plurality of corner connectors 44 and a plurality of straight connectors 46. The bump out kit 270 can include a plurality of fasteners 80. In some instances, the various components of the door kit 340 can be provided fully preassembled, as is shown in FIG. 34, or partially preassembled. Alternatively, the various components of the door kit 340 can be provided disassembled.

The modular design of the pen 10 and/or the kits can afford great flexibility to a user to configure the pen 10 in any of a number of custom shapes. A plurality of the above kits can be used in any combination to achieve a pen 10 with a configuration that suits the needs of the user, the needs of the animal(s), space considerations, and/or other considerations. For example, a user may add or combine multiple kits to create a pen 10 that fits a particular space. Of course, if these considerations change over time, then design of the pen 10 allows a user to remove portions of the pen 10, add portions to the pen 10, and/or reconfigure portions of the pen 10.

In one or more arrangements, one or more of the wall panels 22, one or more of the frame members 32, one or more of the connectors 40, and/or one or more other components of the pen 10 can include ornamentation or decoration. The ornamentation and/or decoration can have any suitable form and/or content. Examples of the ornamentation and/or decoration can include images, designs, symbols, shapes, numbers, logos, emblems, words, letters, phrases, and/or quotations, just to name a few possibilities.

The ornamentation and/or decoration can be provided on one or more of the wall panels 22 in any suitable manner. For instance, the ornamentation and/or decoration can be formed by treating one or more surfaces of one or more wall panels 22 in any manner, now known or later developed. Examples of surface treatment include engraving, etching, frosting, painting, carving, and/or knurling the wall panel(s) 22. Alternatively or in addition, the ornamentation and/or decoration can be provided by attaching one or more separate elements to the wall panel(s) 22. Examples of such separate elements include decals, window clings, stickers, labels, and or signs. The separate element(s) can be attached to the wall panel(s) 22 in any suitable manner, including, for example, one or more forms of adhesives, static cling, one or more fasteners, and/or suction cups.

In some implementations, the kit may also include an information sheet. The information sheet can be one or more pieces of paper. The information sheet can provide any suitable information, such as instructions on the assembly, disassembly, use, and/or care of the pen 10. Further, in one or more arrangements, the kit can include one or more animal-related accessories. For instance, the kit can include one or more water bowls, one or more food bowls, one or more toys, one or more beds, and/or one or more blankets, just to name a few possibilities.

The pen 10 described herein may be suitable for dogs, such as small to medium sized dogs. However, it will be understood that arrangements are not limited in this respect. For instance, in one or more arrangements, the arrangements described herein can be used in connection with larger dogs. Further, the arrangements described herein can be used in connection with other pets, such as birds, reptiles, amphibians, and/or small mammals.

It will be appreciated that arrangements described herein can provide numerous benefits, including one or more of the benefits mentioned herein. For example, arrangements described herein can provide confinement for an animal in a safe, attractive, and low-stress environment. Arrangements described herein can provide an open, modern appearance that looks aesthetically pleasing in the living areas of a home. Thus, the pen does not have to be placed away from the common living areas of the house. As a result, the pet is not further isolated from people. Arrangements described herein can maximize an owner's ability to see his or her pet. Arrangements described herein can provide a dog or other animal with clear visibility of its surroundings or owner, creating a lower stress environment for the pet. Furthermore, there is a trend to humanize pets, so people find it increasingly unappealing to "cage" their beloved animals, but are left with no alternative to cages to keep them safe while out of the home or at night. Arrangements described herein can provide a more "cage free" form of containment.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible.

What is claimed is:

1. An animal pen comprising:
a frame including a plurality of frame members, the plurality of frame members including a substantially vertical frame member that defines a corner of the animal pen, the plurality of frame members being interconnected by a plurality of connectors;
a plurality of walls substantially surrounding a space, each of the walls including one or more wall panels, the frame members being configured to engage and hold the wall panels in a substantially vertical orientation;
a door panel, the door panel being connected to the substantially vertical frame member by one or more hinges, the door panel being configured to be selectively opened and closed, the door panel at least partially defining one of the walls when closed, an access opening to the space being defined when the door panel is opened, whereby an animal can enter or exit the space through the access opening when the door panel is open; and
the frame including a top frame member located above the door panel when closed, the top frame member does not move with the door panel when opened, the top frame member defining an uppermost portion of the frame, the top frame member extending substantially horizontally, the top frame member being configured to be selectively moved out of the way, thereby allowing a person can walk directly into the space without having to step over a top of the animal pen.

2. The animal pen of claim 1, wherein the door panel is operatively connected to the frame by one or more hinges.

3. The animal pen of claim 1, wherein the door panel is configured to be selectively locked and unlocked.

4. The animal pen of claim 3, wherein the door panel includes one or more latching members on an inner side of the door panel and one or more user interface elements on an outer side of the door panel, wherein the one or more latching members are operatively connected to a respective one of the user interface elements, and wherein the latching member is movable in response to a user's manipulation of the user interface element.

5. The animal pen of claim 4, wherein, when the door panel is locked, the one or more latching members are received in a slot in one of the frame members.

6. The animal pen of claim 1, wherein the wall panels and the door panel are solid, and wherein the wall panels and the door panel are made of a transparent or highly translucent material.

7. The animal pen of claim 1, wherein the animal pen is substantially rectangular.

8. The animal pen of claim 1, wherein the frame members are hollow tubular members, the frame members including one or more longitudinally extending slots that open to an exterior of the frame members.

9. The animal pen of claim 1, wherein the top frame member includes a first end and a second end, wherein the first end of the top frame member is configured to be movably connected to the frame, and wherein the second end of the top frame member is configured to be selectively connected and disconnected from the frame.

10. An animal pen comprising
a frame, the frame including a plurality of frame members, the plurality of frame members being interconnected by a plurality of connectors, the frame members being at least partially hollow and being substantially tubular, the frame members including one or more longitudinally extending slots that open to an exterior of the frame member, the plurality of frame members including substantially horizontally extending frame members and substantially vertically extending frame members;

a plurality of walls substantially surrounding a space, each of the walls including one or more wall panels, the wall panels being received in a respective slot of the surrounding frame members such that the wall panels engage with the slots and are held in a substantially vertical orientation, the wall panels being solid and being made of a transparent or highly translucent material; and a door panel operatively connected to the frame, the door panel being configured to be selectively opened and closed, the door panel defining at least a portion of one of the walls when closed, an opening to the space being defined when the door panel is opened, whereby an animal can enter or exit the animal pen through the door opening when the door panel is open, the frame including a top frame member located above the door panel when closed, the top frame member does not move with the door panel when opened, the top frame member defining au uppermost portion of the frame, the top frame member extending substantially horizontally, the top frame member being configured to be selectively moved out of the way, thereby allowing a person to walk directly into the space without having to step over the top of the animal pen.

11. The animal pen of claim 10, wherein the plurality of frame members includes a substantially vertical frame member that defines a corner of the animal pen, wherein the door panel is operatively connected to the substantially vertical frame member by one or more hinges.

12. The animal pen of claim 10, wherein the door panel is configured to be selectively locked and unlocked, wherein the door panel includes one or more latching members on an inner side of the door panel and one or more user interface elements on an outer side of the door panel, wherein the each of the latching members is operatively connected to a respective user interface element, and wherein the latching member is movable in response to a user's manipulation of the user interface element.

13. The animal pen of claim 12, wherein, when the door panel is locked, the one or more latching members are received in one of the one or more longitudinally extending slots in one of the frame members.

14. The animal pen of claim 10, wherein the wall panels are made of acrylic or polycarbonate.

15. The animal pen of claim 10, wherein the animal pen is substantially rectangular.

16. The animal pen of claim 10, wherein the plurality of connectors includes a plurality of corner connectors, and wherein the corner connectors are configured to interconnect a plurality of frame members that meet at a corner of the animal pen.

* * * * *

UNITED STATES PATENT AND TRADEMARK OFFICE
CERTIFICATE OF CORRECTION

| | |
|---|---|
| PATENT NO. | : 11,317,600 B2 |
| APPLICATION NO. | : 16/244055 |
| DATED | : May 3, 2022 |
| INVENTOR(S) | : Huthmaker et al. |

It is certified that error appears in the above-identified patent and that said Letters Patent is hereby corrected as shown below:

In the Claims

Claim 10, Column 20, Line 63: "An animal pen comprising" should be --An animal pen comprising:--

Claim 10, Column 21, Line 25: "defining au uppermost" should be --defining an uppermost--

Signed and Sealed this
Twenty-eighth Day of June, 2022

Katherine Kelly Vidal
*Director of the United States Patent and Trademark Office*